(12) United States Patent
Jankura et al.

(10) Patent No.: US 12,287,059 B2
(45) Date of Patent: Apr. 29, 2025

(54) MOBILE TRIPOD MOUNTING SYSTEM

(71) Applicant: PEAK DESIGN, San Francisco, CA (US)

(72) Inventors: Robb Henry Jankura, San Francisco, CA (US); Matthew Thomas James, San Francisco, CA (US); Arthur Viger, San Francisco, CA (US); Jaimee Erickson, San Francisco, CA (US)

(73) Assignee: PEAK DESIGN, San Francisco, CA (US)

( * ) Notice: Subject to any disclaimer, the term of this patent is extended or adjusted under 35 U.S.C. 154(b) by 0 days.

(21) Appl. No.: 18/563,092

(22) PCT Filed: May 30, 2022

(86) PCT No.: PCT/US2022/031483
§ 371 (c)(1),
(2) Date: Nov. 21, 2023

(87) PCT Pub. No.: WO2022/251723
PCT Pub. Date: Dec. 1, 2022

(65) Prior Publication Data
US 2024/0218965 A1 Jul. 4, 2024

Related U.S. Application Data

(60) Provisional application No. 63/194,263, filed on May 28, 2021.

(51) Int. Cl.
*F16M 11/24* (2006.01)
*F16B 1/00* (2006.01)
(Continued)

(52) U.S. Cl.
CPC ............. *F16M 11/242* (2013.01); *F16B 1/00* (2013.01); *F16M 11/14* (2013.01); *F16M 11/38* (2013.01); *G06F 1/166* (2013.01); *F16B 2200/83* (2023.08)

(58) Field of Classification Search
CPC ........ F16M 11/242; F16M 1/14; F16M 11/38; F16B 1/00; F16B 2001/0035; F16B 2200/83; G06F 1/166
See application file for complete search history.

(56) References Cited

U.S. PATENT DOCUMENTS 719,426 A 2/1903 Boone
2,643,143 A 6/1953 Torgny
(Continued)

FOREIGN PATENT DOCUMENTS

AU 2007237197 B2 11/2012
AU 2014232533 B2 3/2017
(Continued)

OTHER PUBLICATIONS

U.S. Appl. No. 62/881,217, filed Jul. 31, 2019, Robb Jankura.
(Continued)

*Primary Examiner* — Monica E Millner
(74) *Attorney, Agent, or Firm* — Licata & Tyrrell P.C.; Bridget C. Sciamanna

(57) ABSTRACT

One variation of a mobile tripod includes a device case, including a first set of magnetic elements, and a tripod including: a mounting plate defining a leg receptacle and an aperture; a second set of magnetic elements arranged about the leg receptacle and configured to couple to the first set of magnetic elements to retain the mounting plate against the device case; a set of socket sections coupled to the mounting plate, arranged within the aperture, and defining a socket; a leg assembly configured to seat within the leg receptacle in (Continued)

a retracted position and deploy outward from the exterior face of the device case to mount to a base surface in a deployed position; a spherical end, coupled to the leg assembly, and configured to rotate within the socket, encapsulated by the set of socket sections, to pivot the leg assembly between the retracted position and the deployed position.

12 Claims, 15 Drawing Sheets

(51) Int. Cl.
*F16M 11/14* (2006.01)
*F16M 11/38* (2006.01)
*G06F 1/16* (2006.01)

(56) References Cited

U.S. PATENT DOCUMENTS

| | | | |
|---|---|---|---|
| 2,661,649 A | 12/1953 | Skinner | |
| 3,312,138 A | 4/1967 | Cumming | |
| 3,612,462 A | 10/1971 | Mooney et al. | |
| 4,274,301 A | 6/1981 | Katayama | |
| 4,317,552 A | 3/1982 | Weidler | |
| 4,380,407 A | 4/1983 | Ponan, Jr. | |
| 4,798,273 A | 1/1989 | Ward | |
| 5,109,411 A | 4/1992 | O'Connell | |
| 5,232,304 A | 8/1993 | Huang | |
| 5,323,600 A | 6/1994 | Munshi | |
| 5,423,566 A | 6/1995 | Warrington et al. | |
| 5,429,381 A | 7/1995 | Mercat et al. | |
| 5,661,942 A | 9/1997 | Palmer | |
| 5,746,407 A | 5/1998 | Nakatani | |
| 5,752,711 A | 5/1998 | Moreau | |
| 5,845,885 A | 12/1998 | Carnevali | |
| 6,135,408 A | 10/2000 | Richter | |
| 6,149,116 A | 11/2000 | Won | |
| 6,234,042 B1 | 5/2001 | An | |
| 6,234,506 B1 | 5/2001 | Li | |
| 6,244,131 B1 | 6/2001 | Liao | |
| 6,378,815 B1 | 4/2002 | Lee | |
| 6,445,498 B1 | 9/2002 | Baun et al. | |
| 6,561,400 B2 | 5/2003 | Lee | |
| 6,609,686 B2 | 8/2003 | Malizia | |
| 6,827,319 B2 | 12/2004 | Mayr | |
| 6,920,806 B2 | 7/2005 | Cutsforth | |
| 7,128,297 B2 | 10/2006 | Lee | H04M 1/0214 396/419 |
| D537,323 S | 2/2007 | Saez | |
| 7,273,203 B2 | 9/2007 | Carnevali | |
| 7,374,142 B2 | 5/2008 | Carnevali | |
| 7,398,952 B2 | 7/2008 | Carnevali | |
| 7,431,251 B2 | 10/2008 | Carnevali | |
| D588,903 S | 3/2009 | Carnevali | |
| 7,594,631 B1 | 9/2009 | Carnevali | |
| 7,624,955 B2 | 12/2009 | McGill | |
| D608,771 S | 1/2010 | Hsu | |
| 7,731,140 B2 | 6/2010 | Carnevali | |
| 7,891,618 B2 | 2/2011 | Carnevali | |
| 8,020,828 B2 | 9/2011 | Carnevali | |
| 8,235,340 B2 | 8/2012 | Carnevali | |
| 8,261,954 B2 | 9/2012 | Lee | |
| 8,267,418 B1 | 9/2012 | Chuang | |
| 8,317,048 B2 | 11/2012 | Hajichristou et al. | |
| 8,382,059 B2 | 2/2013 | Le Gette | F16M 11/105 248/463 |
| 8,456,834 B2 | 6/2013 | Zhu et al. | |
| 8,553,408 B2 | 10/2013 | Supran et al. | |
| 8,602,277 B2 | 12/2013 | Lee | |
| 8,602,376 B2 | 12/2013 | Vogel et al. | |
| 8,608,502 B2 | 12/2013 | Witter et al. | |
| 8,613,379 B2 | 12/2013 | Lee | |
| 8,616,508 B1 | 12/2013 | Coleman | F16M 11/2021 248/176.1 |
| 8,627,990 B2 | 1/2014 | Nakajima et al. | |
| 8,636,429 B2 | 1/2014 | Chen | |
| 8,641,714 B2 | 2/2014 | Steiner et al. | |
| 8,708,151 B2 | 4/2014 | Whitten et al. | |
| 8,708,205 B2 | 4/2014 | Wotton | |
| 8,807,496 B2 | 8/2014 | Kessler et al. | |
| 8,824,166 B2 * | 9/2014 | Rohrbach | F16M 13/00 248/467 |
| 8,830,663 B2 | 9/2014 | Child et al. | |
| 8,870,146 B2 | 10/2014 | Vogel et al. | |
| D718,612 S | 12/2014 | McSweyn et al. | |
| D726,175 S | 4/2015 | Tsai et al. | |
| 9,060,416 B2 | 6/2015 | Supran et al. | |
| D739,708 S | 9/2015 | McSweyn et al. | |
| D740,830 S | 10/2015 | Chu | |
| 9,185,953 B2 | 11/2015 | Whitten et al. | |
| 9,213,220 B2 * | 12/2015 | Fowler | H04N 23/60 |
| 9,243,739 B2 | 1/2016 | Peters | |
| D749,596 S | 2/2016 | Khodapanah et al. | |
| 9,317,076 B2 | 4/2016 | Rayner | |
| 9,437,969 B2 | 9/2016 | Witter et al. | |
| 9,451,817 B2 * | 9/2016 | Oh | H04B 1/3877 |
| 9,498,034 B2 | 11/2016 | Whitten et al. | |
| 9,592,871 B2 | 3/2017 | Whitten et al. | |
| 9,611,881 B2 | 4/2017 | Khodapanah et al. | |
| 9,644,783 B2 * | 5/2017 | Rinner | F16M 11/38 |
| 9,651,069 B2 | 5/2017 | Aspinall et al. | |
| 9,689,527 B2 | 6/2017 | Franklin | |
| D792,415 S | 7/2017 | Tsai | |
| 9,700,114 B2 | 7/2017 | Whitten et al. | |
| 9,704,632 B2 | 7/2017 | Baca | |
| 9,765,921 B2 | 9/2017 | Vogel et al. | |
| 9,773,601 B2 | 9/2017 | Breiwa et al. | |
| 9,800,283 B2 | 10/2017 | Schmidt | |
| D804,413 S | 12/2017 | McSweyn et al. | |
| D805,085 S | 12/2017 | Xiang et al. | |
| 9,847,805 B2 | 12/2017 | Sirichai | |
| 9,848,071 B2 | 12/2017 | Thiers | |
| 9,869,423 B2 | 1/2018 | Khodapanah et al. | |
| 9,872,544 B2 | 1/2018 | Ho | |
| D818,421 S | 5/2018 | Hu | |
| 10,036,507 B2 | 7/2018 | Vogel et al. | |
| 10,066,779 B2 | 9/2018 | Vogel et al. | |
| 10,070,707 B2 | 9/2018 | Whitten et al. | |
| 10,078,346 B2 | 9/2018 | Lay et al. | |
| 10,088,096 B2 | 10/2018 | Minn et al. | |
| 10,125,921 B2 | 11/2018 | Khodapanah et al. | |
| 10,134,517 B2 | 11/2018 | Baca | |
| 10,192,665 B2 | 1/2019 | Breiwa et al. | |
| 10,215,330 B2 | 2/2019 | Vogel et al. | |
| D842,306 S | 3/2019 | Lindo et al. | |
| 10,237,384 B2 | 3/2019 | Holder | |
| D845,963 S | 4/2019 | Lindo et al. | |
| D846,543 S | 4/2019 | Chen | |
| D847,823 S | 5/2019 | Monsalve et al. | |
| D852,196 S | 6/2019 | Alves | |
| D852,681 S | 7/2019 | Peters et al. | |
| D854,021 S | 7/2019 | Alves | |
| 10,348,874 B2 | 7/2019 | Penfold | A45C 11/00 |
| 10,505,392 B2 | 12/2019 | McSweyn et al. | |
| D873,812 S | 1/2020 | Peters et al. | |
| 10,569,717 B2 | 2/2020 | Peters et al. | |
| 10,571,964 B2 | 2/2020 | Barnett et al. | |
| D877,741 S | 3/2020 | Leeds-Frank | |
| 10,649,492 B2 | 5/2020 | Peters et al. | |
| 10,694,012 B2 | 6/2020 | Krenn | |
| 10,760,732 B1 | 9/2020 | Koh et al. | |
| 10,899,285 B2 | 1/2021 | Aloe et al. | |
| 11,234,510 B2 * | 2/2022 | Perelli | H02J 50/10 |
| 11,239,697 B2 | 2/2022 | Min | |
| 11,246,233 B2 | 2/2022 | Venkatesh et al. | |
| 11,317,526 B2 * | 4/2022 | Hsu | H05K 5/0204 |
| 11,719,382 B2 * | 8/2023 | Jankura | F16M 11/14 248/371 |
| 2002/0113185 A1 | 8/2002 | Ziegler | |
| 2003/0218108 A1 | 11/2003 | Werner | |
| 2005/0284991 A1 | 12/2005 | Saez | |
| 2007/0040084 A1 | 2/2007 | Sturman et al. | |

(56) References Cited

U.S. PATENT DOCUMENTS

| | | | |
|---|---|---|---|
| 2008/0191105 A1 | 8/2008 | Bogel | F16M 11/16 248/170 |
| 2008/0224000 A1 | 9/2008 | Yang | |
| 2009/0250567 A1 | 10/2009 | Raynaud | |
| 2010/0019109 A1 | 1/2010 | Liu | |
| 2011/0147546 A1 | 6/2011 | Monsalve et al. | |
| 2011/0204111 A1 | 8/2011 | Lee | |
| 2011/0260016 A1 | 10/2011 | Johnson et al. | |
| 2011/0260017 A1 | 10/2011 | Monsalve et al. | |
| 2012/0025039 A1* | 2/2012 | Segal | F16M 11/38 248/188.6 |
| 2012/0062691 A1 | 3/2012 | Fowler | F16M 11/2014 348/E5.026 |
| 2012/0195585 A1 | 8/2012 | Wagner | F16M 11/32 396/428 |
| 2013/0114951 A1 | 5/2013 | Darrow | F16M 13/022 396/428 |
| 2013/0175413 A1 | 7/2013 | Waugh | |
| 2014/0354218 A1 | 12/2014 | Kaynar et al. | |
| 2015/0076296 A1 | 3/2015 | Yang | |
| 2015/0158545 A1 | 6/2015 | Lanz | |
| 2015/0201113 A1* | 7/2015 | Wood | F16M 13/04 348/376 |
| 2015/0286117 A1 | 10/2015 | Sung et al. | |
| 2016/0150861 A1 | 6/2016 | Yao et al. | |
| 2016/0309865 A1 | 10/2016 | Chiang | |
| 2016/0347257 A1 | 12/2016 | Buchanan | |
| 2017/0276291 A1 | 9/2017 | Subratie et al. | F16M 13/02 |
| 2017/0370517 A1 | 12/2017 | Underwood | |
| 2019/0009850 A1 | 1/2019 | Peters | |
| 2019/0198212 A1 | 6/2019 | Levy | |
| 2019/0230205 A1 | 7/2019 | Lee | |
| 2019/0371504 A1 | 12/2019 | Breiwa et al. | |
| 2020/0150514 A1 | 5/2020 | Li | F16M 13/00 |
| 2020/0217452 A1 | 7/2020 | Shan | F16M 11/28 |
| 2020/0366131 A1 | 11/2020 | Min | |
| 2021/0026409 A1 | 1/2021 | Miles et al. | |
| 2021/0041057 A1 | 2/2021 | Jankura et al. | |
| 2021/0045256 A1 | 2/2021 | Hsu | H05K 5/0204 |
| 2021/0046885 A1 | 2/2021 | Jankura et al. | |
| 2021/0059401 A1* | 3/2021 | Perelli | A47B 97/04 |
| 2021/0337057 A1 | 10/2021 | McCoy | F16M 11/12 |
| 2021/0367452 A1 | 11/2021 | Nahum et al. | |
| 2022/0069399 A1 | 3/2022 | Williams | H01M 50/207 |
| 2022/0137491 A1 | 5/2022 | Stankie | F16M 11/041 396/428 |
| 2022/0140653 A1 | 5/2022 | Blaser et al. | |
| 2022/0214602 A1 | 7/2022 | Zhu et al. | |
| 2022/0218101 A1* | 7/2022 | Garcia | H04R 1/08 |

FOREIGN PATENT DOCUMENTS

| | | |
|---|---|---|
| CN | 201228837 | 4/2009 |
| CN | 202518427 U | 11/2012 |
| CN | 103003615 B | 3/2015 |
| CN | 105122132 A | 12/2015 |
| CN | 206341268 U | 7/2017 |
| CN | 105247266 B | 1/2018 |
| CN | 107816609 A | 3/2018 |
| CN | 209860980 U | 12/2019 |
| CN | 212745681 U | 3/2021 |
| CN | 213479596 U | 6/2021 |
| CN | 215111698 U | 12/2021 |
| CN | 215111699 U | 12/2021 |
| DE | 202004017041 U1 | 1/2005 |
| EP | 0736447 A1 | 10/1996 |
| EP | 2925594 B1 | 1/2017 |
| FR | 2990406 B1 | 4/2014 |
| TW | M493509 U | 1/2015 |
| WO | 03033335 A1 | 4/2003 |
| WO | 2010017668 A1 | 2/2010 |
| WO | 12014078493 A1 | 5/2014 |
| WO | 12019227141 A1 | 12/2019 |
| WO | 2020055560 A1 | 3/2020 |
| WO | 2022047882 A1 | 3/2022 |
| WO | 2022047883 A1 | 3/2022 |

OTHER PUBLICATIONS

International Search Report received in PCT/US20/32758 dated Aug. 10, 2020.
Non-Final Office Action for U.S. Appl. No. 16/945,687 dated May 25, 2022.
Non-Final Office Action for U.S. Appl. No. 17/067,612 dated May 25, 2022.
Non-Final Office Action for U.S. Appl. No. 16/501,118 mailed on Apr. 7, 2020; 6 pages.
Notice of Allowance and Fees Due for U.S. Appl. No. 16/501,118 dated Feb. 10, 2021.
Notice of Allowance and Fees Due for U.S. Appl. No. 17/127,944 dated Mar. 2, 2022.
Notice of Allowance and Fees Due from U.S. Appl. No. 15/931,503 dated Oct. 26, 2020.
Office Action for Chinese Patent Application No. 202080051078X dated May 22, 2022; 9 pages.
Office Action for Japanese Patent Application No. 2021-567894 dated May 31, 2022; 6 pages.
Office Action from U.S. Appl. No. 17/127,944 dated Nov. 1, 2021.
Notice of Allowance in U.S. Appl. No. 17/827,870 dated Apr. 10, 2023.
International Search Report in PCT/US2022/031483 dated Sep. 19, 2022.
Written Opinion of the Internal Search Authority in PCT/US2022/031483 dated Sep. 19, 2022.
International Preliminary Report on Patentability in PCT/US2022/031483 dated Nov. 21, 2023.
Extended European Search Report in EP 22812321.1 dated Mar. 10, 2025.

* cited by examiner

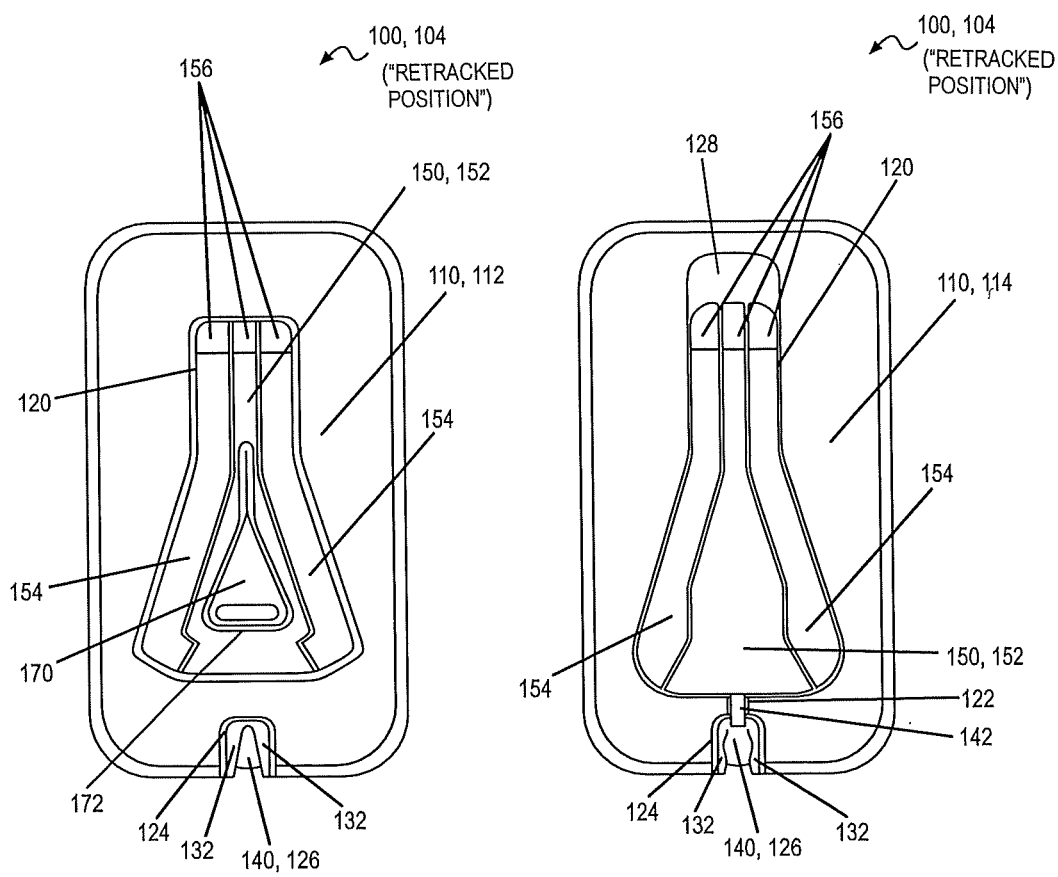
FIGURE 1A   FIGURE 1B

("retracted position")

100, 104

100, 104

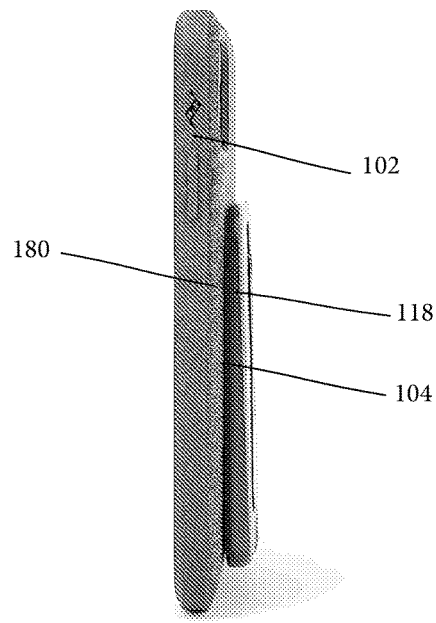
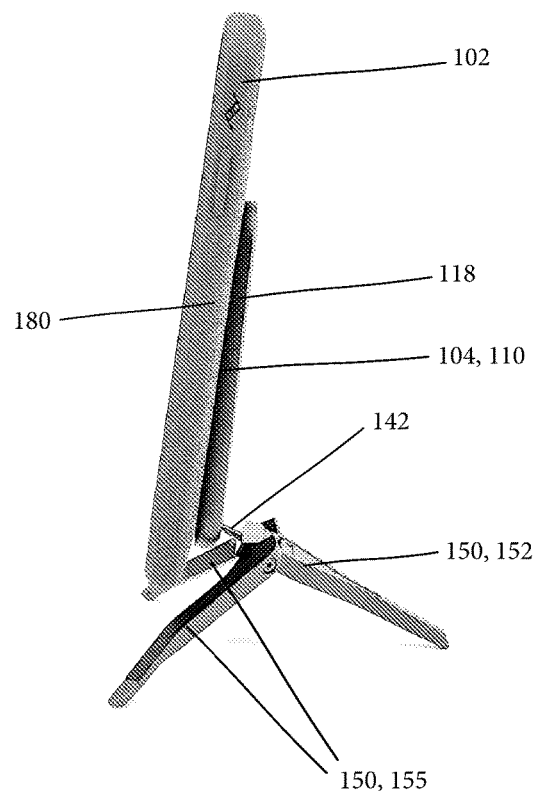
FIGURE 19A  FIGURE 19B

MOBILE TRIPOD MOUNTING SYSTEM

CROSS-REFERENCE TO RELATED APPLICATIONS

This Application is the U.S. National Stage of International Application No. PCT/US2022/031483 filed May 30, 2022, which claims the benefit of priority from U.S. Provisional Application No. 63/194,263, filed on May 28, 2021, each of which is incorporated in its entirety by this reference.

This Application is related to U.S. patent application Ser. No. 17/067,612, filed on 9 Oct. 2020, and U.S. patent application Ser. No. 16/945,687, filed on 31 Jul. 2020, which claims the benefit of U.S. Provisional Application No. 62/881,217, filed on 31 Jul. 2019, each of which is incorporated in its entirety by this reference.

TECHNICAL FIELD

This invention relates generally to the field of mobile mounting accessories and more specifically to a new and useful mobile mounting system in the field of mobile device accessories.

BRIEF DESCRIPTION OF THE FIGURES

FIGS. 1A and 1B are schematic representations of a mobile tripod;

FIGS. 19A and 19B are schematic representations of the mobile tripod system.

DESCRIPTION OF THE EMBODIMENTS

Figure 2A:
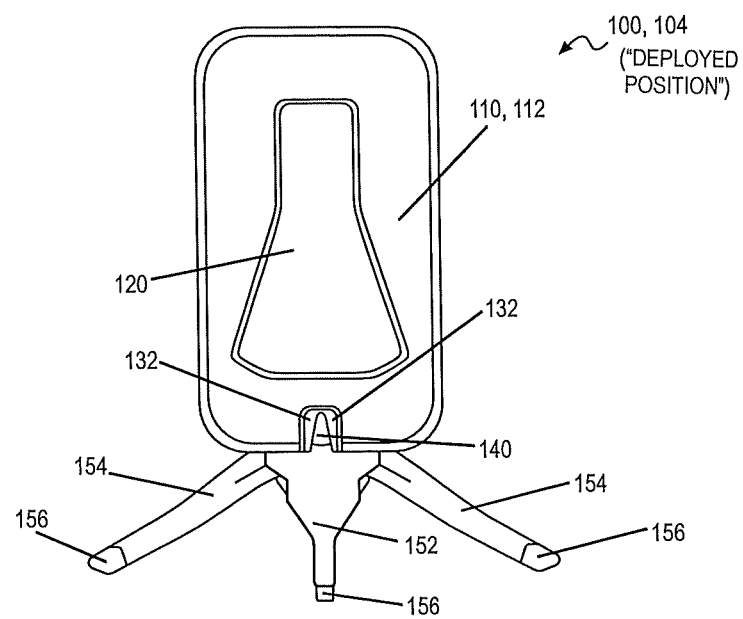
FIGS. 2A and 2B are schematic representations of the mobile tripod.
Figure 2B:
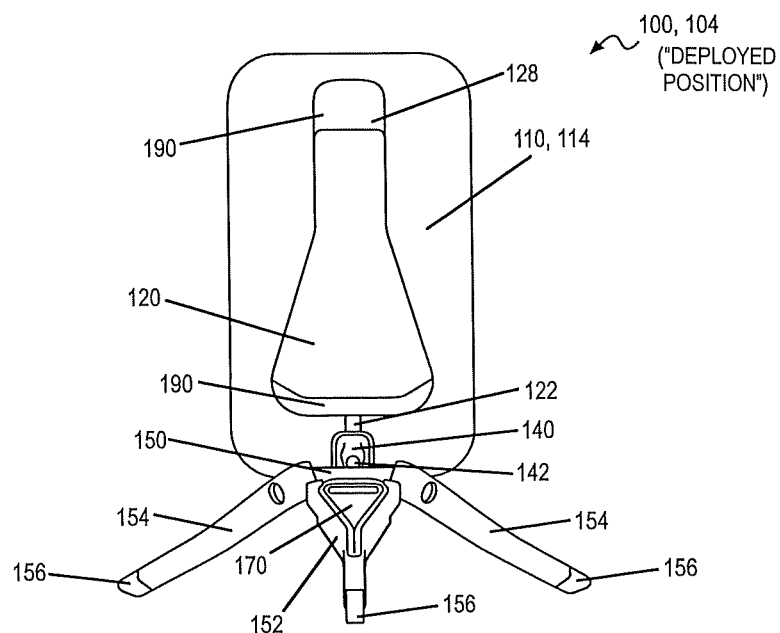
Figure 3:
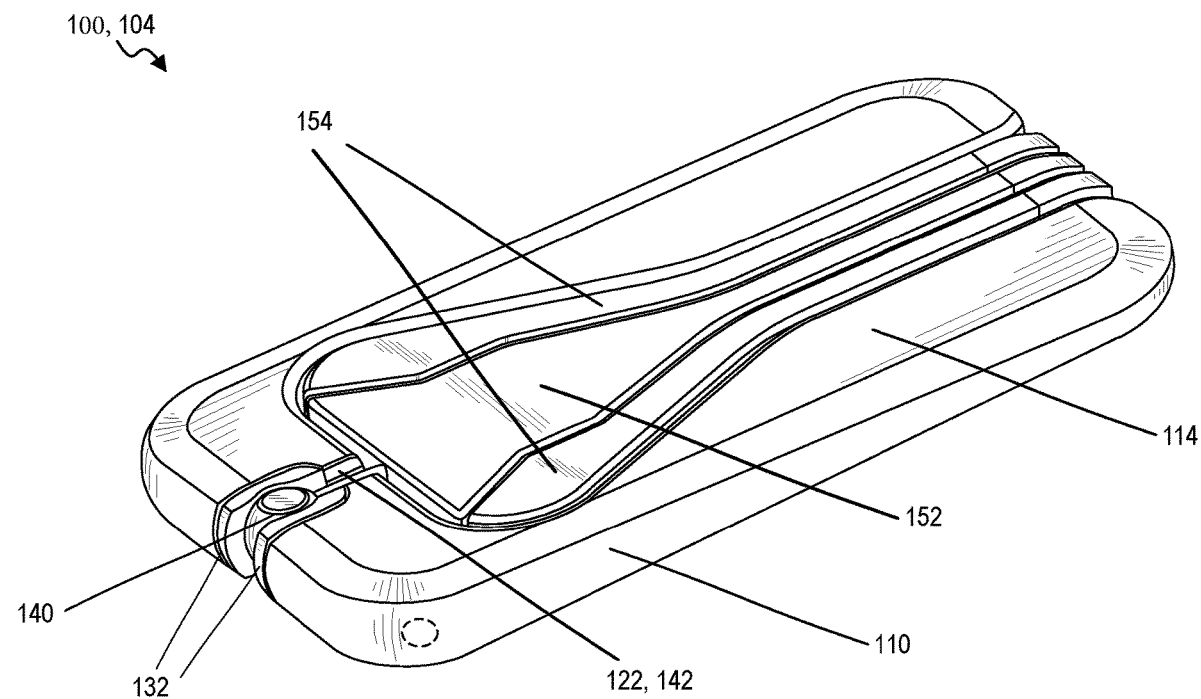
FIG. 3 is a schematic representation of the mobile tripod.
Figure 4:
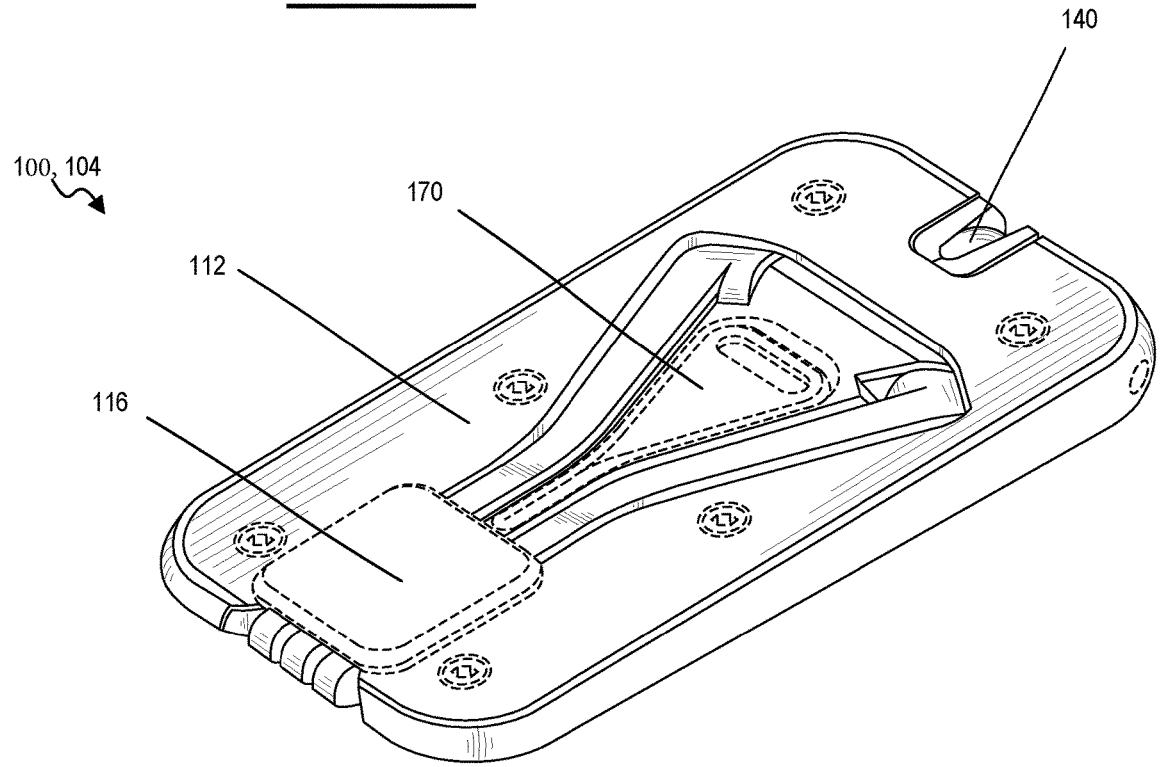
FIG. 4 is a schematic representation of the mobile tripod.
Figure 5:
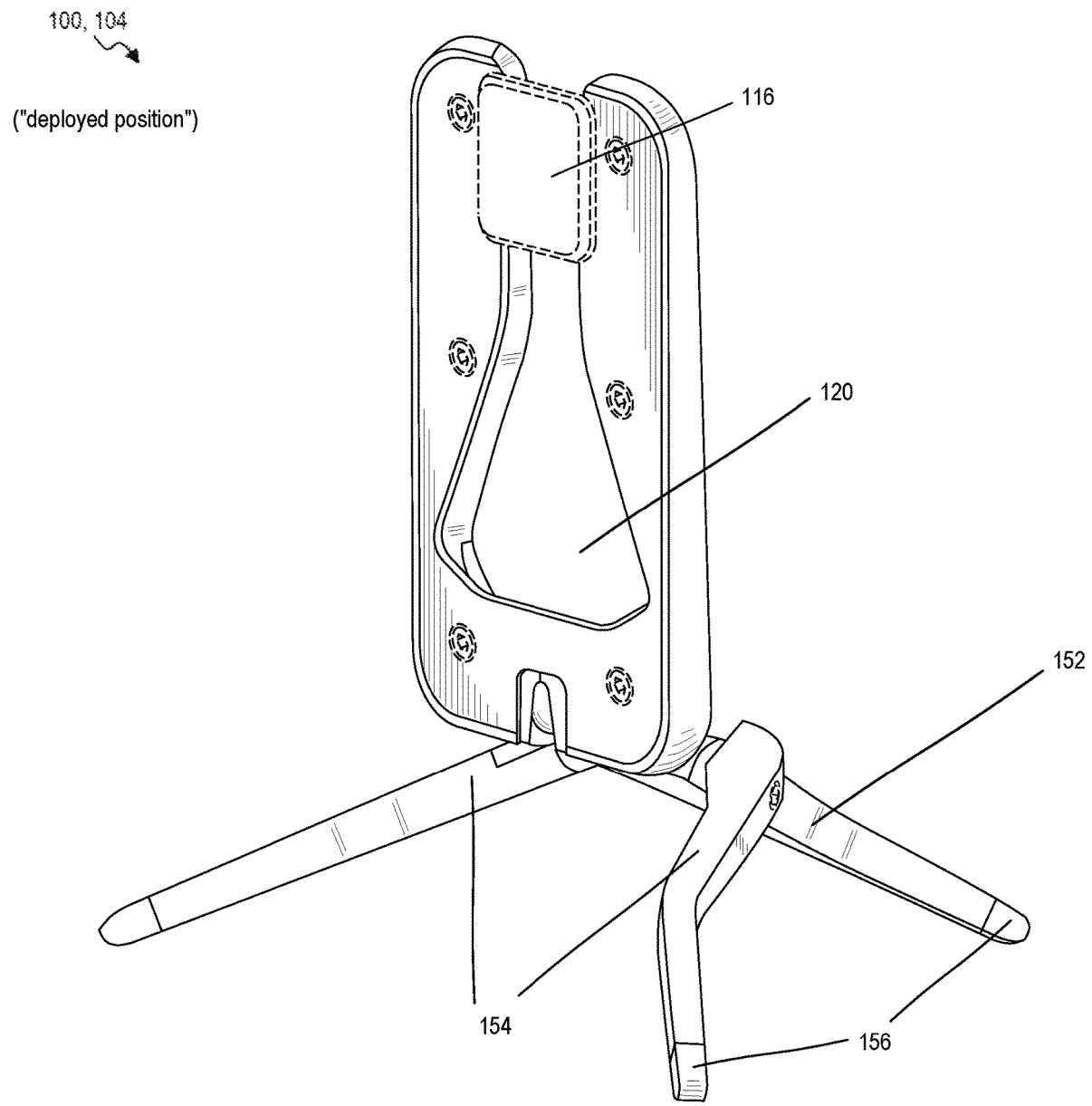
FIG. 5 is a schematic representation of the mobile tripod.
Figure 6:
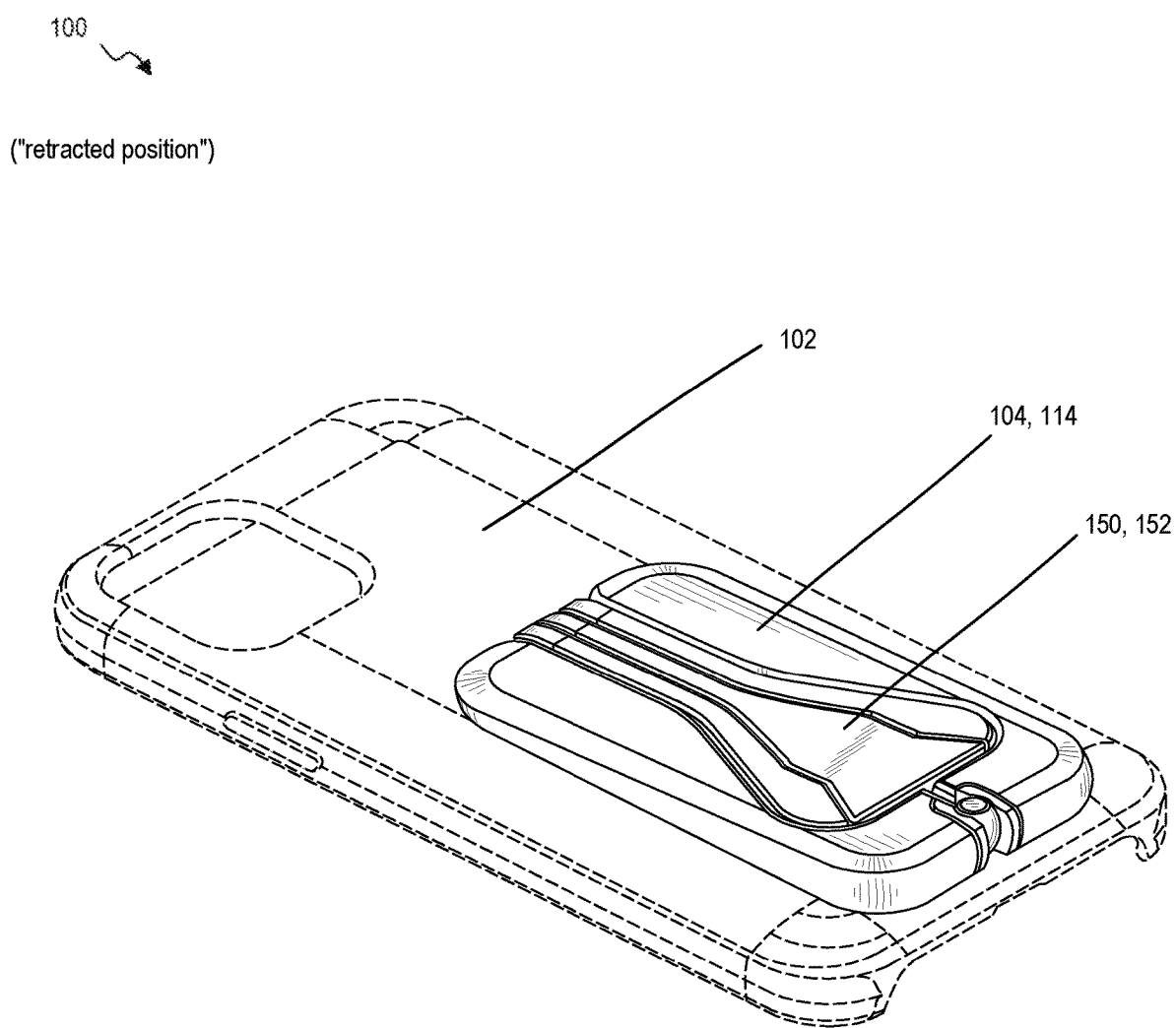
FIG. 6 is a schematic representation of the tripod mounting system.
Figure 7:
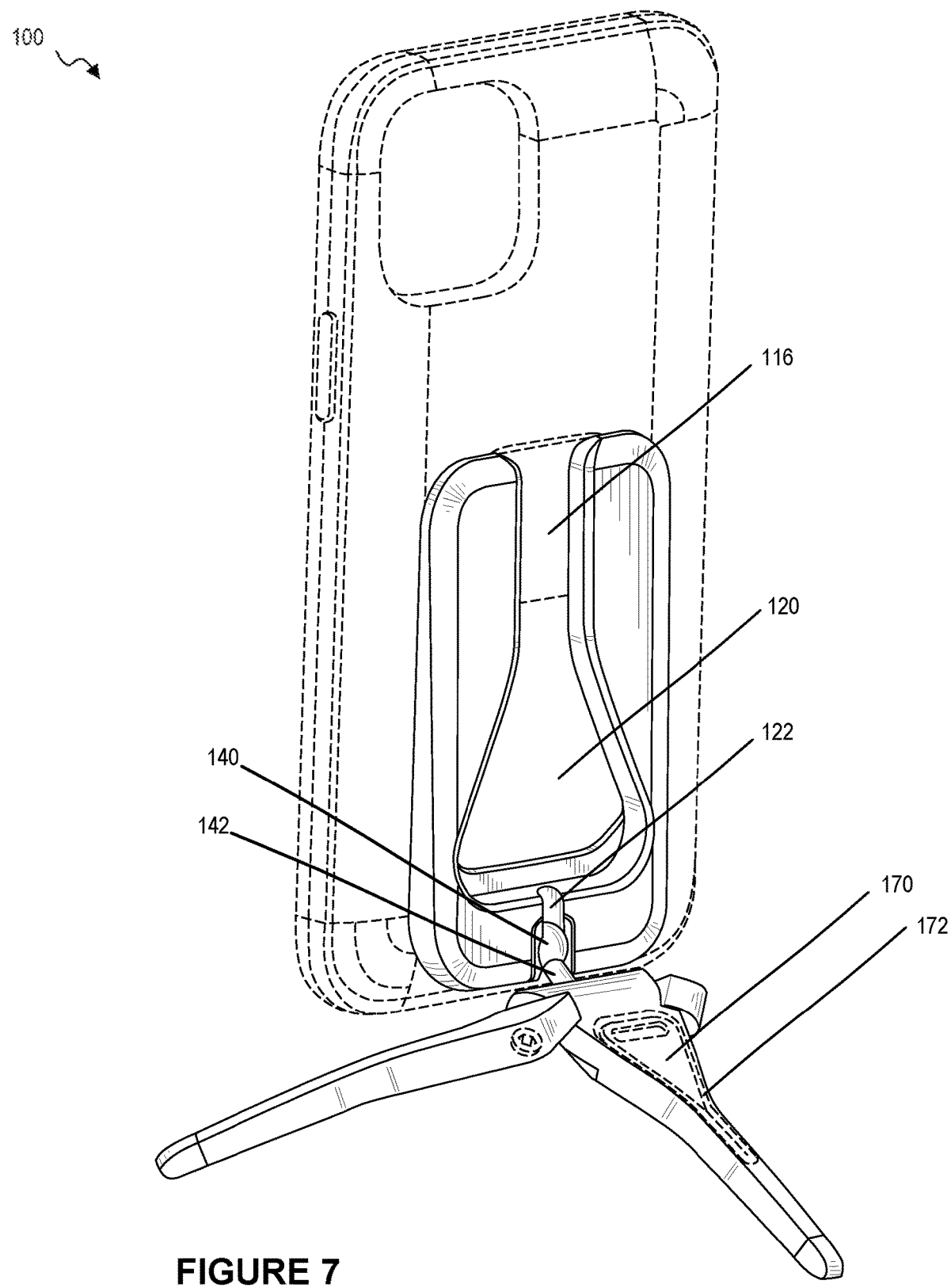
FIG. 7 is a schematic representation of a tripod mounting system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Tripod Mounting System

As shown in FIGS. 1A, 1B, 2A, 2B, 3-13, 14A, 14B, 15A-15I, 16A-16I, 17A-17I, 18A-18I, 19A, and 19B, a tripod mounting system 100 includes: a device case 102 including a first set of magnetic elements 180 arranged in a first pattern; and a mobile tripod 104 (or "tripod" 104).

The tripod 104 includes: a mounting plate 110; a leg assembly 150; and a connector 142 pivotably coupled to the mounting plate 110 and coupled to the leg assembly 150.

The mounting plate 110 includes: a mounting plate 110 defining a leg receptacle 120, an aperture 124 arranged along an edge of the mounting plate 110, and a channel 122 extending along an outer face 114 of the mounting plate 110 between the leg receptacle 120 and the aperture 124; a second set of magnetic elements 118 arranged in a second pattern about the leg receptacle 120 and configured to transiently couple to the first set of magnetic elements 180 to retain an inner face 112 of the mounting plate 110, opposite the outer face 114, against an exterior face of the device case 102; and a set of socket sections 132 flexibly coupled to the mounting plate 110, arranged within the aperture 124, and defining a socket 126.

The leg assembly 150 is pivotably coupled to the mounting plate 110 and configured to: transiently seat within the leg receptacle 120 in a retracted position; and deploy outward from the exterior face of the device case 102 into a target footprint to mount the tripod 104 to a base surface in a deployed position.

The connector 142: extends from the leg assembly 150 and is configured to seat within the channel 122 in the retracted position; and includes a spherical end 140 arranged within the socket 126, encapsulated by the set of socket sections 132, and is configured to rotate within the socket 126 to pivot the leg assembly 150 between the retracted position and the deployed position.

One variation of the tripod 104 includes: a spherical end 140; a mounting plate 110 pivotably coupled to the spherical end 140; and a leg assembly 150 coupled to the spherical end 140. In this variation, the mounting plate 110 includes: a mounting plate 110 defining a leg receptacle 120, an aperture 124 arranged along an edge of the mounting plate 110, and a channel 122 extending between the leg receptacle 120 and the aperture 124; and a second set of magnetic elements 118 arranged in a second pattern about the leg receptacle 120 and configured to transiently couple to the first set of magnetic elements 180 to retain an inner face 112 of the mounting plate 110, opposite the outer face 114, against an exterior face of the device case 102; a leg assembly 150 coupled to the spherical end 140; and a pivot control assembly 130.

In the preceding variation, the pivot control assembly 130 includes: a set of socket sections 132 flexibly coupled to the mounting plate 110, arranged within the aperture 124, and defining a socket 126; a threaded section 136 arranged adjacent the set of socket sections 132 and extending along an axis orthogonal a central axis defined by the channel 122; a spring section 134 arranged between the threaded section 136 and the set of socket sections 132 and configured to bias the set of socket sections 132 onto the spherical end 140; and a pivot-control feature 138 (e.g., a screw) coupled to the threaded section 136 and configured to maintain compression of the spring section 134 against the set of socket sections 132, bias the set of socket sections 132 onto the spherical end 140, and maintain a target clamping force between the set of socket sections 132 and the spherical end 140. In this variation, the leg assembly 150 is configured to: transiently seat within the leg receptacle 120 in a retracted position; and deploy outward from the leg receptacle 120 into a target footprint to mount the tripod 104 to a base surface responsive to application of a rotational force, exceeding the target clamping force, on the spherical end 140.

One variation of the tripod mounting system 100 includes: a device case 102 defining a bore arranged on an exterior face of the device case 102 and including a first set of magnetic elements 180 arranged about the bore; and a tripod including a mounting plate 110, a leg assembly 150, and a spherical end 140. In this variation, the mounting plate 110 includes: a mounting plate 110 defining a leg receptacle 120 arranged on an upper region of the mounting plate 110 and an aperture 124 arranged on a lower region of the mounting plate 110; a boss 116 extending from an inner face 112 of the mounting plate 110 and configured to insert into the bore to constrain rotation of the mounting plate 110 relative the device case 102; a second set of magnetic elements 118 arranged about the leg receptacle 120 and configured to transiently couple to the first set of magnetic elements 180 to retain the inner face 112 of the mounting plate 110 against the exterior face of the device case 102; and a set of socket sections 132 flexibly coupled to the mounting plate 110, arranged within the aperture 124, and defining a socket 126. In this variation, the leg assembly 150 is pivotably coupled to the mounting plate 110 and configured to: transiently seat within the leg receptacle 120 in a retracted position; and deploy outward from the exterior face of the device case 102 into a target footprint to mount the tripod 104 to a base surface in a deployed position. In this variation, the spherical end 140 is: coupled to the leg assembly 150; encapsulated by the set of socket sections 132 within the socket 126; and configured to rotate within the socket 126 to pivot the leg assembly 150 between the retracted position and the deployed position.

One variation of the tripod mounting system 100 includes a device case 102 and a mobile tripod 104. In this variation, the device case 102 includes: an insert 186 including a rectangular bore 182; and a first set of magnetic elements 180 arranged in a first pattern about the rectangular bore 182. The mobile tripod 104 includes: a mounting plate 110; a connector 142; a leg assembly 150; and a pivot control assembly 130.

Figure 8:
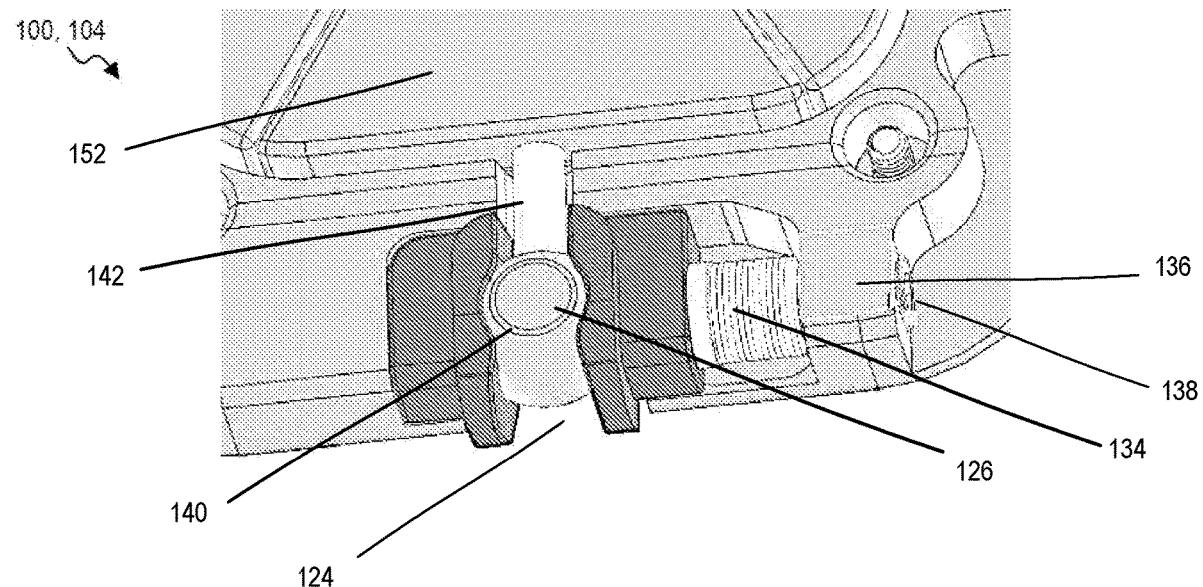
FIG. 8 is a schematic representation the mobile tripod.

In the preceding variation, the mounting plate 110 includes: a polygonal boss 116 extending from an inner face 112 of the mounting plate 110 and configured to insert into the rectangular bore 182 of the device case 102; and a second set of magnetic elements 118 arranged in a second pattern about the polygonal boss 116 and configured to transiently couple to the first set of magnetic elements 180 of the device case 102 to align the polygonal boss 116 with the rectangular bore 182 of the insert 186 of the device case 102, to transiently retain the mobile tripod 104 against an exterior face of the device case 102. The mounting plate 110 further defines: a leg receptacle 120 configured to house the leg assembly 150; and an aperture 124 configured to house the pivot control assembly 130 that defines a socket 126 configured to house a spherical end 140; and a channel 122 extending from the leg receptacle 120 to the aperture 124 and configured to transiently house the connector 142. The connector 142 is pivotably coupled to the mounting plate 110 and configured to transiently seat with the channel 122 of the mounting plate 110. The connector 142 defines: a first end coupled to the spherical end 140 housed within the socket 126; and a second end coupled to the leg assembly 150. The leg assembly 150 includes a set of legs pivotably coupled to the mobile tripod 104. The leg assembly 150 is coupled to the second end of the connector 142 and is configured to: transiently seat within the leg receptacle 120 in a retracted position; and seat in a range of orientations to mount the mobile tripod 104 to a base surface in a deployed position. As shown in FIG. 8, the pivot control assembly 130 is integrated within the mounting plate 110 within the aperture 124 and includes: a set of socket sections 132 configured to form the socket 126 and retain the spherical end 140; a threaded section 136 extending along an axis orthogonal a central axis defined by the channel 122; a pivot-control feature 138 configured to translate along the threaded section 136 responsive to rotation; a spring section 134 configured to bias the set of socket sections 132 onto the spherical end 140 to withhold rotation of the spherical end 140 within the socket 126 relative the set of socket sections 132 during rotation of the pivot-control feature 138 in a first direction.

In one variation, as shown in FIGS. 1A, 2B, 4, 7, and 10, the mounting plate 110 includes a tool receptacle 172: arranged on an inner surface of a center leg 152 of the leg assembly 150; and configured to transiently house a removable tool 170 configured to rotate the pivot-control feature 138.

Figure 9:
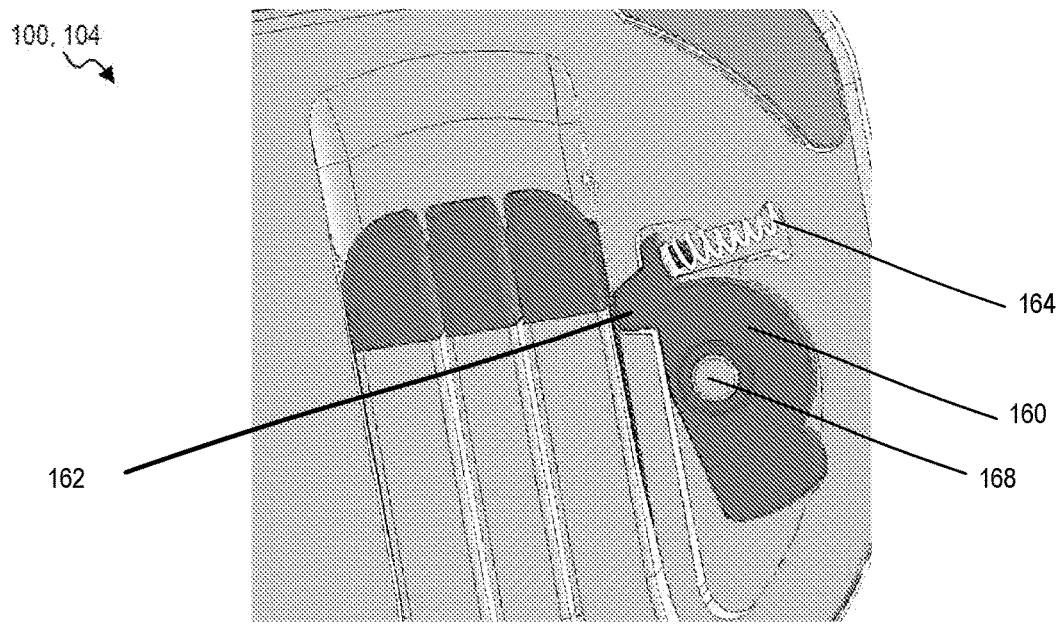
FIG. 9 is a schematic representation the mobile tripod.
Figure 10:
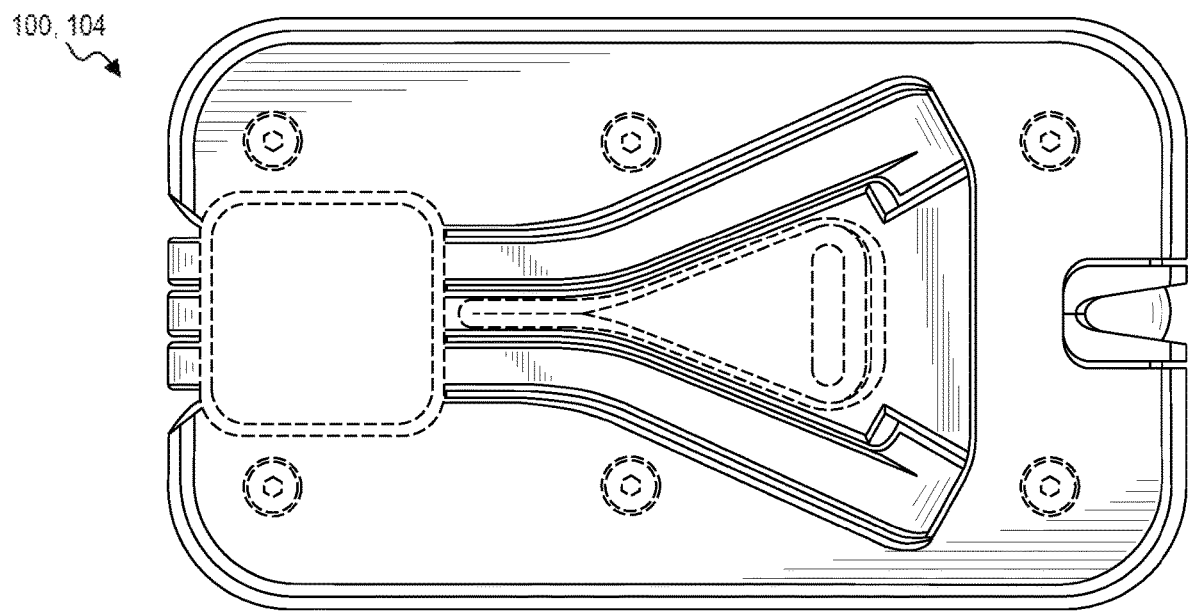
FIG. 10 is a schematic representation the mobile tripod.
Figure 11:
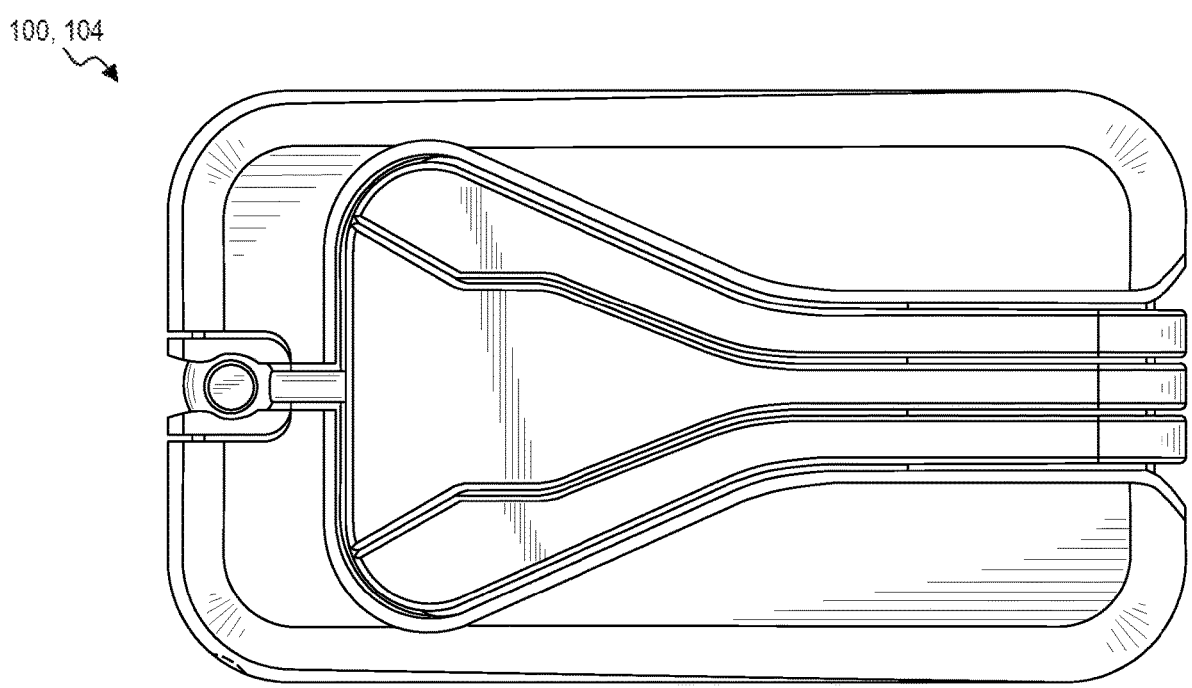
FIG. 11 is a schematic representation the mobile tripod.
Figure 12:
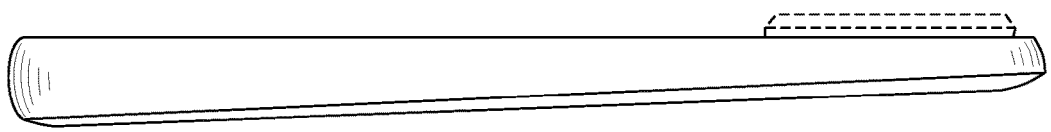
FIG. 12 is a schematic representation the mobile tripod.
Figure 13:
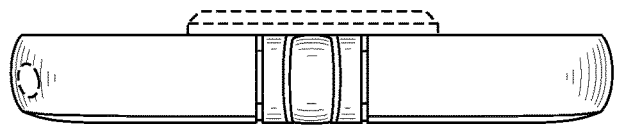
FIG. 13 is a schematic representation of the mobile tripod.

In another variation, as shown in FIG. 9, the mounting plate 110: defines a boss 116 receptacle configured to transiently house the polygonal boss 116; and includes a boss 116 locking tab 160 integrated into the mounting plate 110 adjacent the boss 116 receptacle. The boss 116 locking tab 160 can be configured to: pivot in a first direction about a pivot to insert a tooth 162 of the boss 116 locking tab 160 into a recess 166 of the polygonal boss 116 to lock the polygonal boss 116 within the boss 116 receptacle; and pivot in a second direction about the pivot to remove the tooth 162 from the recess 166 of the polygonal boss 116 to remove the polygonal boss 116 from the boss 116 receptacle.

2. Applications

Generally, the tripod mounting system 100 includes a device case 102 and a mobile tripod 104 (hereinafter "tripod" 104) configured to transiently engage and support the device case 102. The device case 102 includes a first set of magnetic elements 180 arranged about the rectangular bore 182 and positioned to guide the mobile tripod into a portrait or landscape orientation against an exterior face of the device case 102. The mobile tripod 104 includes a mounting plate 110 including a second set of magnetic elements 118 configured to transiently couple with the first set of magnetic elements 180 of the device case 102 to retain the mounting plate 110 against the device case 102. A user may therefore quickly locate and passively mount the device case 102 onto the mobile tripod 104 with a single hand and in a single motion by aligning the first set of magnetic elements 180 with the second set of magnetic elements 118.

The mobile tripod 104 further includes a leg assembly 150 including a set of legs (e.g., 3 legs) rotatably coupled to the mounting plate 110, configured to retract into the mounting plate 110 to seat flush with the outer face 114 of the mounting plate 110, and configured to open rearward from the mounting plate 110 (e.g., away from the device case 102) to extend into a widened three-point footprint in a deployed position to securely support the device case 102 over a base surface (e.g., a flat, angled, or uneven surface). By enabling the leg assembly 150 to seat flush with the outer face 114 of the mounting plate 110 in the retracted position, the mobile tripod 104: limits or eliminates features that project outwardly from the mounting plate 110 and that may snag on clothing (e.g., pockets); increases compactness and space efficiency of the mobile tripod 104 in the retracted position; and improves ease of transport and accessibility of the mobile tripod 104 for a user. For example, a user may couple her device case 102—coupled to her mobile device—to the mobile tripod 104; deploy the leg assembly 150 from the retracted position to the deployed position in a particular footprint to capture a photo; return the leg assembly 150 to the retracted position; and place her device case 102 in her pocket without the leg assembly 150 or other features of the mobile tripod 104 snagging on her pocket and/or obtruding from the mounting plate 110.

In particular, the leg assembly 150 can be configured to transition between a retracted position (e.g., stored within the mounting plate 110) and a deployed position in which the leg assembly 150—including a set of legs (e.g., 3 legs)—can be positioned in a range of footprints. The leg assembly 150 can be pivotably coupled to the mounting plate 110 at a pivot point defined by a center of a spherical end 140 coupled to the leg assembly 150 via a connector 142 extending between the spherical end 140 and the leg assembly 150. More specifically, the mounting plate 110 defines: a leg receptacle 120 configured to house the leg assembly 150 in the retracted position; a aperture 124 configured to house a pivot control assembly 130 defining a socket 126 configured to house the spherical end 140; and a channel 122 extending between the leg receptacle 120 and the channel 122 and configured to transiently house the connector 142 when the leg assembly 150 is in the retracted position. The spherical end 140 can be configured to rotate within the socket 126, thereby enabling rotation of the connector 142 and leg assembly 150 relative the mounting plate 110. Further, the aperture 124 can be configured to enable rotation of the connector 142 about the mounting plate 110, such that the connector 142 can rotate beyond a plane defined by the mounting plate 110 (e.g., greater than 180 degrees from the retracted position).

The pivot control assembly 130 can be integrated into the aperture 124 of the mounting plate 110 and can be configured to fix an orientation of the spherical end 140 within the socket 126 responsive to rotation of a pivot-control feature 138 by a user. In particular, the pivot control assembly 130 can include: a set of socket sections 132 configured to form the socket 126 encapsulating the spherical end 140 and configured to constrain lateral movement of the spherical end 140 relative the mounting plate 110; a spring section 134 (e.g., a stack of concentric, concave washers) defining a high spring rate and arranged adjacent the set of socket sections 132; a pivot-control feature 138 accessible to a user and configured to translate within a threaded section 136 coaxial the spring section 134 to depress the spring section 134 toward the set of socket sections 132 responsive to rotation in a first direction, such that the spring section 134 maintains a holding torque between the set of socket sections 132 and the spherical end 140 to constrain rotation of the spherical end 140 within the socket 126, thereby locking an orientation of the spherical end 140—and therefore an orientation of the connector 142 and the leg assembly 150—relative the mounting plate 110. Therefore, a user may manipulate the pivot-control feature 138 (e.g., a screw) to "lock" and "unlock" an orientation of the spherical end 140 within the socket 126, thereby enabling the user to "lock" and "unlock" an orientation of the leg assembly 150 relative the mounting plate 110.

Additionally, the mobile tripod 104 can include a removable tool 170 integrated within a center leg 152 of the leg assembly 150 and configured to manipulate the pivot-control feature 138. In particular, the center leg 152 can define a tool receptacle 172 integrated within an inner surface of the center leg 152—flush with the exterior face of the device case 102 in the retracted position—such that exterior face of the device case 102 forms a wall preventing the removable tool 170 from falling out of the tool receptacle 172.

Additionally, in one variation, the mounting plate 110 104 can include a removable boss 116. In particular, the mobile tripod 104 can include a boss 116 locking tab 160 configured to: engage the polygonal boss 116 to retain the polygonal boss 116 within the mounting plate 110; and transiently disengage (e.g., responsive to a user depressing the boss 116 locking tab 160) the polygonal boss 116 to release the polygonal boss 116 from within the mounting plate 110. Therefore, a user may manipulate the boss 116 locking tab 160 to remove the polygonal boss 116 from the mounting plate 110 and couple her mobile device case 102 to the mobile tripod 104—absent the polygonal boss 116—via magnetic coupling between magnetic features of the mobile device case 102 and the mobile tripod 104. The user may then freely rotate her mobile device case 102—housing her mobile device—between a portrait orientation and a landscape orientation while the mobile device case 102 is mounted (i.e., coupled) to the mobile tripod 104, by aligning magnetic features of the mobile device case 102 and the mobile tripod 104 in different orientations. Further, in this variation, the mobile tripod 104 can be configured to couple to any magnetic device case 102 (e.g., a generic device case 102 incorporating magnetic features)—such as a generic magnetic device case 102 without a rectangular bore 182—such that the inner face 112 of the mounting plate 110 seats flush with an exterior face of the generic magnetic device case 102.

3. Device Case

The mobile tripod 104 can be configured to couple with a device case 102 configured to accept and retain a mobile device (e.g., a smartphone, a tablet, a smartwatch).

Figure 14A:
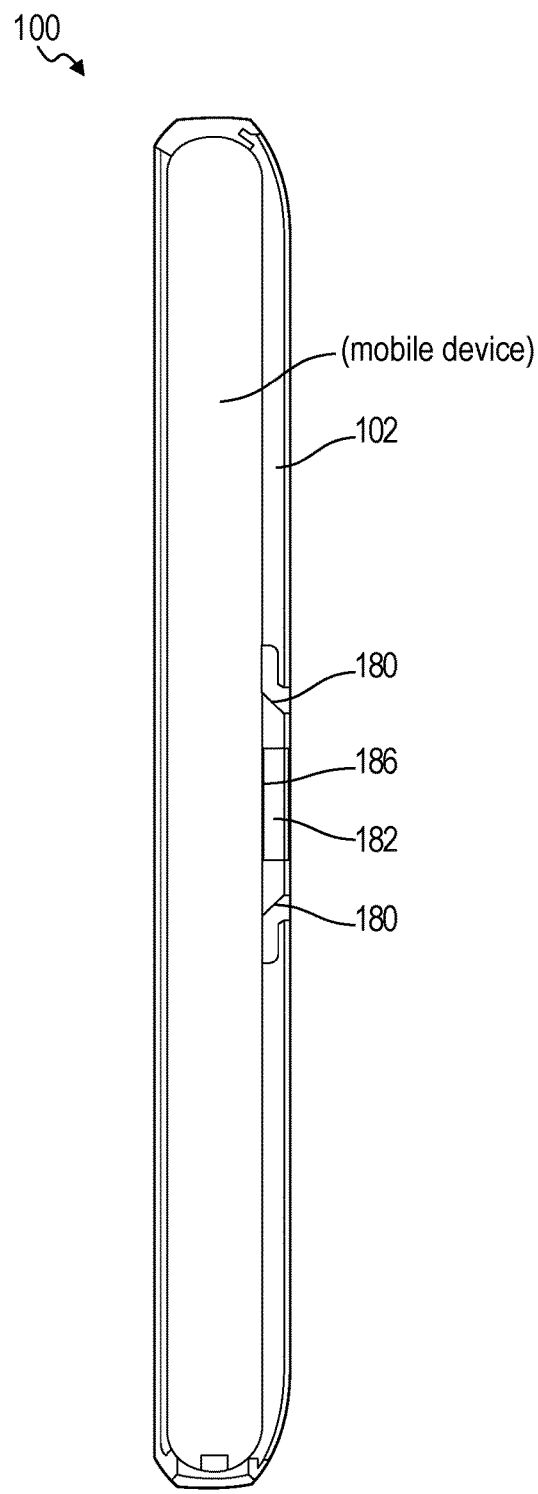
FIGS. 14A and 14B are schematic representations of a device case.
Figure 14B:
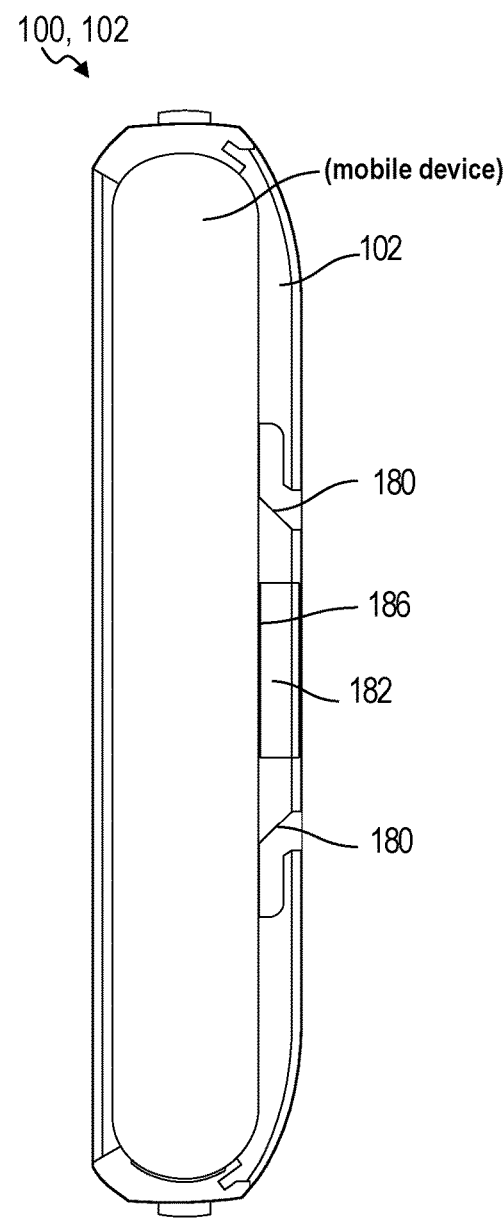
Figure 15C:
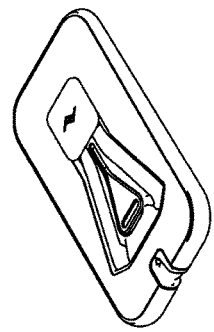
FIGS. 15A-15I are schematic representations of the mobile tripod.
Figure 15F:
Figure 15I:
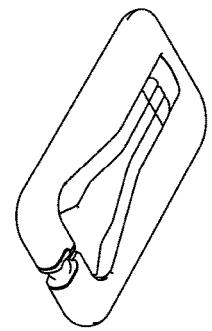
Figure 15B:
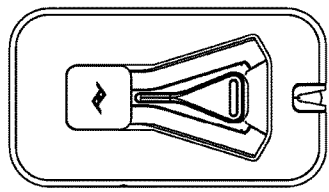
Figure 15E:
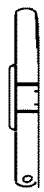
Figure 15H:
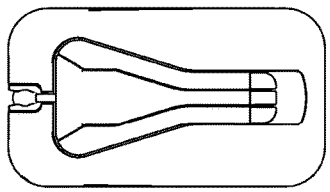
Figure 15A:
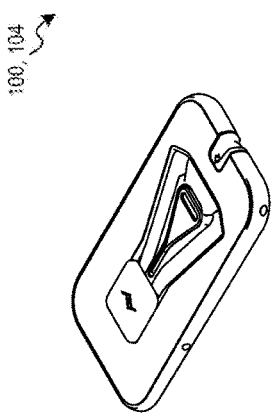
Figure 15D:
Figure 15G:
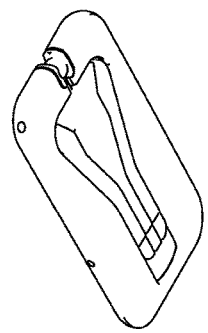
Figure 16C:
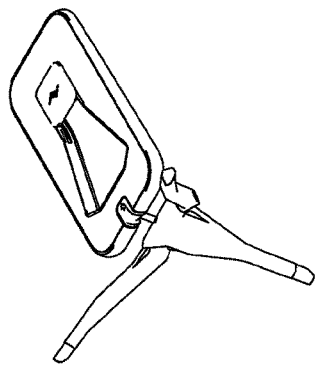
FIGS. 16A-16I are schematic representations of the mobile tripod.
Figure 16F:
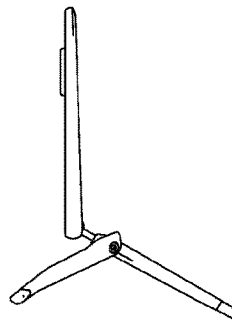
Figure 16I:
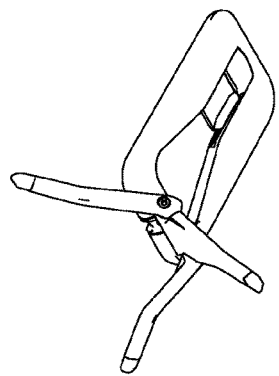
Figure 16B:
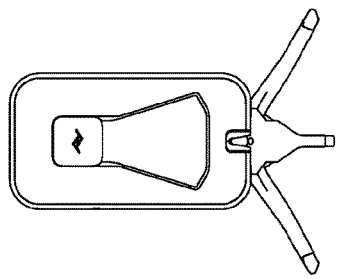
Figure 16E:
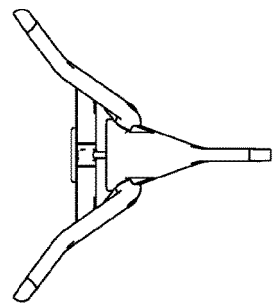
Figure 16H:
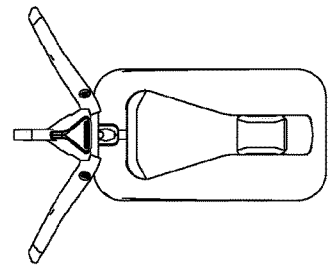
Figure 16A:
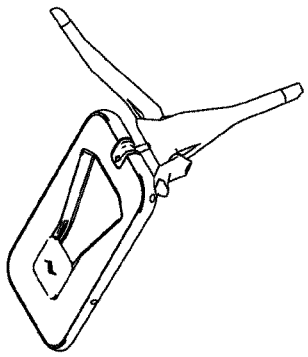
Figure 16D:
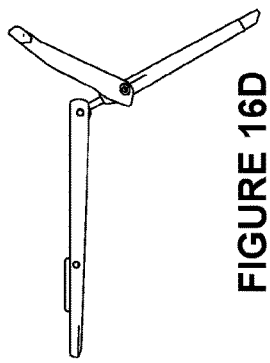
Figure 16G:
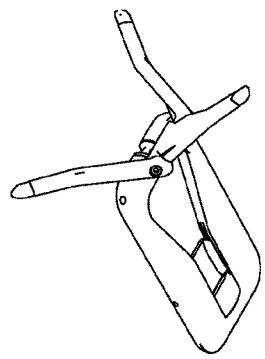
Figure 17C:
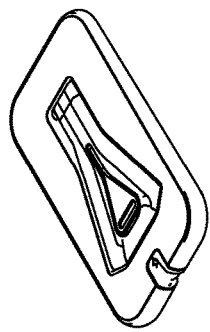
FIGS. 17A-17I are schematic representations of the mobile tripod system.
Figure 17F:
Figure 17I:
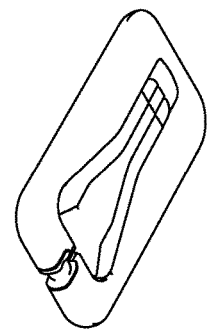
Figure 17B:
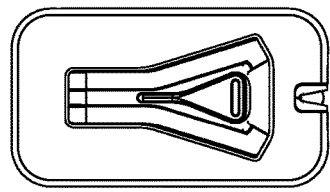
Figure 17E:
Figure 17H:
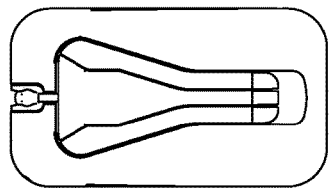
Figure 17A:
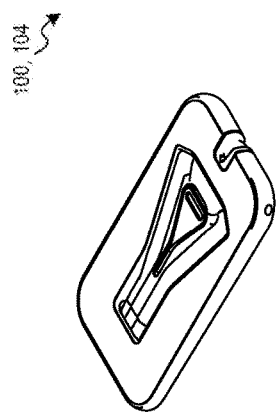
Figure 17D:
Figure 17G:
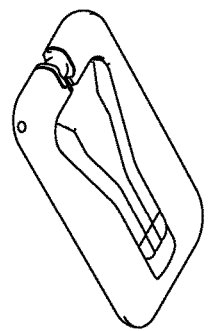
Figure 18C:
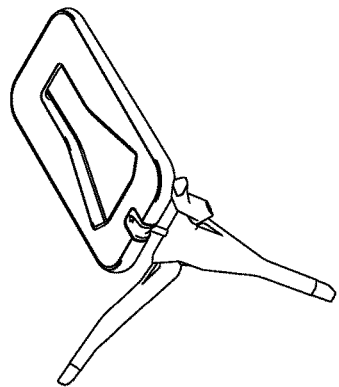
FIGS. 18A-18I are schematic representations of the mobile tripod system.
Figure 18F:
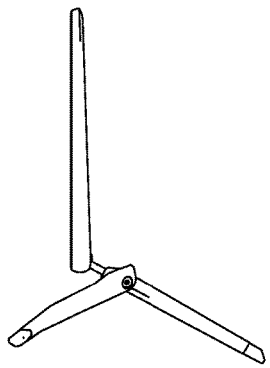
Figure 18I:
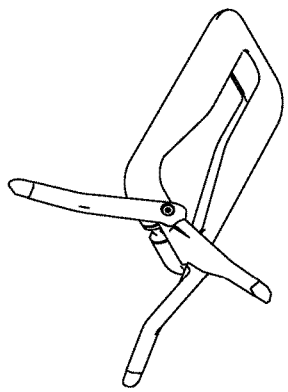
Figure 18B:
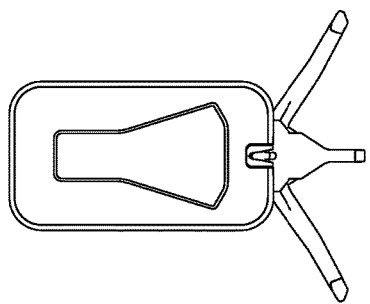
Figure 18E:
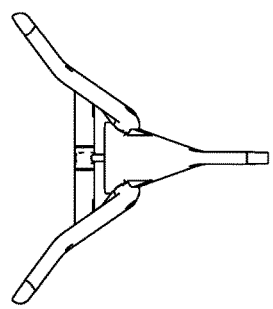
Figure 18H:
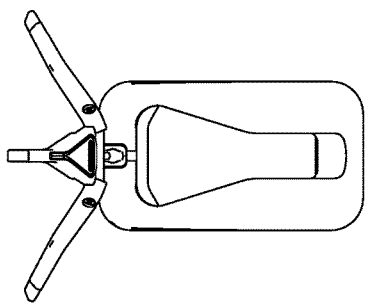
Figure 18A:
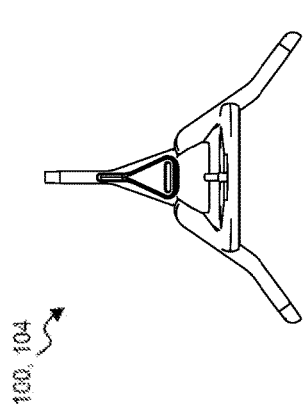
Figure 18D:
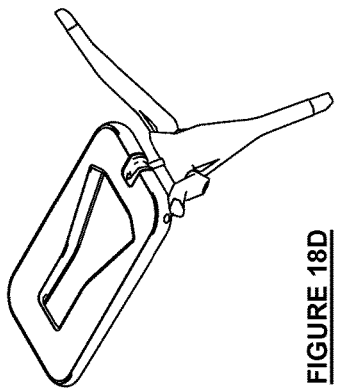
Figure 18G:
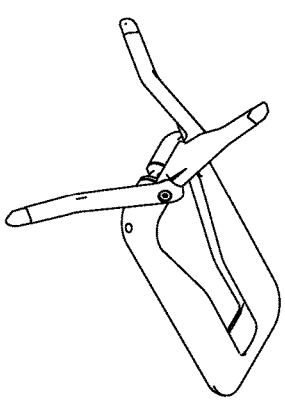

Generally, as shown in FIGS. 14A and 14B, the device case 102 includes a first set of magnetic elements 180 integrated into the device case 102 and configured to transiently couple to a second set of magnetic elements 118 of the tripod 104 to couple the tripod 104 to the device case 102. The device case 102 can be configured to: accept and retain the mobile device (e.g., a smartphone, a tablet) within a cavity on an interior face of the device case 102; and couple to the tripod 104 on an exterior face of the device case 102—via coupling of the first and second set of magnetic elements 118—such that a user may couple her mobile device, within the device case 102, to the mobile tripod 104 in order to affix or mount her mobile device to a particular surface and continue viewing and/or interacting with a display of the mobile device.

In one implementation, the device case 102 can include a polymer housing configured to accept and retain the mobile device and a first set of magnetic elements 180—integrated into the polymer housing (e.g., within an insert 186 bonded to or press-fit into the polymer housing)—configured to transiently couple to a second set of magnetic elements 118 of the tripod 104.

Additionally and/or alternatively, in another implementation, the device case 102 can include: an insert 186—integrated into the device case 102—defining a bore; and a first set of magnetic elements 180 arranged about the rectangular bore 182 configured to transiently couple to a second set of magnetic elements 118 arranged within a mounting plate 110 of the mobile tripod 104. In this implementation, the device case 102 can be configured to accept and retain the mobile device (e.g., a smartphone, a tablet) within an aperture 124 on an interior face of the device case 102 and retain a boss 116 (e.g., a rectangular boss 116) of the mobile tripod 104 within the rectangular bore 182 on an exterior face of the device case 102.

In the preceding implementation, the device case 102 can include a polymer housing configured to accept and retain the mobile device and a non-polymer insert configured to transiently couple to a mount. The device case 102 can be machined such that the non-polymer insert is securely attached to the polymer housing, such that the insert 186 can support both the polymer housing and a mobile device retained within the polymer housing when coupled to a mount. For example, the device case 102 can be machined via bonding the non-polymer insert to the polymer housing. In another example, the device case 102 can be machined via press-fitting the insert 186 into the polymer housing.

3.1 First Set of Magnetic Elements

In one implementation, the device case 102 can include a first set of magnetic elements 180 (e.g., an array of magnetic elements, a set of two or four magnetic elements)—such as a set of passive magnetic and/or ferrous elements and/or a set of active magnetic and/or ferrous elements—in a first pattern within the device case 102 (e.g., approximately flush with an exterior surface of the device case 102) and configured to transiently couple with a second set of magnetic elements 118 of the tripod 104. In particular, in this implementation, the first set of magnetic elements 180 can be configured to retain the tripod 104 plate—including the second set of magnetic elements 118—against an exterior face of the device case 102 via magnetic coupling of the first set of magnetic elements 180 with the second set of magnetic elements 118.

Furthermore, in the preceding implementation, the device case 102 can include the first set of magnetic elements 180 arranged in a particular pattern corresponding to (e.g., compatible and/or substantially identical) a pattern of the second set of magnetic elements 118 of the tripod 104, such that the first set of magnetic elements 180 in the device case 102 magnetically couple to the second set of magnetic elements 118 in the mobile tripod 104 in a set of orientations, such as a first and second landscape orientation (e.g., upright and/or upside-down) and a first and second portrait orientation.

For example, the first set of magnetic elements 180 can include an array (e.g., a Halbach array) of magnetic elements (e.g., a magnet, a ferrous material) arranged in a pattern exhibiting rotational symmetry greater than four, such as in a circular pattern and/or in a rectangular pattern. In another example, the first set of magnetic elements 180 can include a set of four magnetic elements embedded at each corner of the insert 186, forming a rounded square of magnetic elements configured to apply a magnetic force at each corner of the insert 186 to reduce jostling and vibration of the device case 102. In yet another example, the second set of magnetic elements 118 can include two magnetic elements embedded within the insert 186. The two magnetic elements can be arranged within undercut sections on opposite sides of the insert 186 (or on adjacent sides of the insert 186) to engage with two magnetic elements in a complementary arrangement on the mobile tripod 104. The two magnetic elements can further define a set of device case 102 orientations with respect to the mobile tripod 104 by defining a second magnetic anchor point for each orientation.

Additionally, in another implementation—in which the device case 102 includes a rectangular bore 182 configured to couple with the polygonal boss 116 of the tripod 104—the device case 102 can include a first set of magnetic elements 180 (e.g., a set of four magnetic elements or Halbach arrays) arranged in a pattern about the rectangular bore 182. Similarly, in this implementation, the device case 102 can include the first set of magnetic elements 180 arranged in a particular pattern corresponding to a pattern of the second set of magnetic elements 118 of the tripod 104, such that the first set of magnetic elements 180 in the device case 102 magnetically couple to the second set of magnetic elements 118 in the mobile tripod 104 in each of the orientations supported by the rectangular bore 182 of the insert 186 and a polygonal boss 116 of the mobile tripod 104.

3.2 Insert

In one implementation, the device case 102 can include an insert 186 configured to couple the device case 102 with the mount. The insert 186 can include a rectangular bore 182 configured to accept the polygonal boss 116 of the mount and define a set of undercut sections 116 about the rectangular bore 182. Generally, the insert 186 can be formed of a rigid non-magnetic material, such as machined titanium, sintered ceramic, or tungsten carbide.

The insert 186 can include a rigid plate formed of a substantially non-magnetic (e.g., non-conductive) material (e.g., a non-magnetic ceramic, aluminum, alumina, titanium, carbon fiber, fiberglass, polymers, reinforced polymers, composites). The insert 186 can include this rigid plate in order to enable coupling of the insert 186 to the mount while supporting both the device case 102 and a mobile device retained within the device case 102. For example, the device case 102 can include: a polymer housing configured to accept and retain the mobile device; and an insert 186 including a ceramic structure (e.g., a ceramic rigid plate). By including an insert 186 of a non-magnetic material, the first set of magnetic elements 180 of the device case 102 can couple to the second set of magnetic elements 118 of the mount without interference by the insert 186, thus enabling the insert 186 to properly align with the mount (e.g., the polygonal boss 116 of the mount).

In the preceding implementation, the insert 186 can define an outer surface—configured to mate with the mount 120—that is substantially flush with an exterior face of the device case 102. For example, the device case 102 can define a thickness of an exterior face of the device case 102, the exterior face defining an inner wall configured to couple with a mobile device and an outer wall opposite the inner wall. The insert 186 can be configured such that the outer surface of the insert 186 falls within a threshold distance of the inner wall of the exterior face of the device case 102 corresponding to the thickness of the exterior face. In this example, the user may remove her mobile phone—housed within the device case 102—from her pocket in a single swift motion without the device case 102 and/or insert snagging on fabric in her pocket. In one variation, the insert 186 defines a thickness approximating a thickness of the exterior face of the device case 102 (e.g., less than three millimeters, less than five millimeters, etc.). In this variation, the device case 102 can exhibit a consistent thickness across the exterior face—including across an area corresponding to the insert 186—while the insert 186 is sufficiently strong to couple to the mount and support a mobile device housed within the device case 102.

4. Mobile Tripod

Generally, the mobile tripod 104 is configured to: magnetically and/or mechanically couple to the exterior face of the device case 102, such as via magnetic coupling of the first and second set of magnetic elements 118 and/or via insertion of the polygonal boss 116 of the mounting plate 110 into the rectangular bore 182 of the device case 102; extend into a deployed position to mount the device case 102 (e.g., housing a mobile device)—coupled to the tripod 104—to a base surface (e.g., a table, a floor, a lawn); and collapse—while coupled to and/or decoupled from the device case 102—into a retracted position (e.g., for storage).

In particular, the mobile tripod 104 can include: a mounting plate 110 configured to couple (e.g., magnetically couple) to the exterior face of the device case 102; and a leg assembly 150—pivotably coupled to the mounting plate 110—configured to pivot between a retracted position and a deployed position to transiently mount the mobile tripod 104—and the device case 102 (e.g., housing a mobile device of a user) to a base surface; and a spherical end 140—rotatably coupled to the mounting plate 110 and rigidly coupled to the leg assembly 150 (e.g., via the connector 142)—configured to rotate about a rotational axis to pivot the leg assembly 150 between the retracted position and the deployed position. The mobile tripod 104 can further include a connector 142 (e.g., a column) extending between the leg assembly 150 and the spherical end 140, thereby rigidly coupling the leg assembly 150 to the spherical end 140.

4.1 Tripod Mounting Plate

The mobile tripod 104 includes a tripod mounting plate 110 (hereinafter "mounting plate 110" 110) configured to couple with a device case 102 to mount a mobile device (e.g., a smartphone, a tablet) coupled to the device case 102 to the mobile tripod 104. Generally, the mounting plate 110: includes a second set of magnetic elements 118 (e.g., a set of magnets, ferrous material) configured to transiently couple to the first set of magnetic elements 180 of the device case 102 to securely couple the mobile tripod 104 to the device case 102 and/or the user's mobile device; and defines a leg receptacle 120 configured to receive and/or retain the leg assembly 150 in the retracted position. Further, the mounting plate 110 is configured to house and/or retain the spherical end 140—rigidly coupled to the leg assembly 150—while enabling rotation of the spherical end 140 (e.g., about a rotational axis defined by the spherical end 140) relative the mounting plate 110, thereby enabling the leg assembly 150—pivotably coupled to the mounting plate 110—to pivot between the retracted position, within the leg receptacle 120, and a deployed position.

In one implementation, the mounting plate 110 defines: a leg receptacle 120 arranged on an outer face 114 of the mounting plate 110 opposite the inner face 112 and configured to transiently house a leg assembly 150 coupled to the mounting plate 110; and an aperture 124 arranged adjacent the leg receptacle 120 on the outer face 114 of the mounting plate 110 and configured to house a spherical end 140 pivotably coupled to the mounting plate 110 and enable pivoting of the connector 142 about the mounting plate 110.

In the preceding implementation, the mounting plate 110 can be configured to: couple to the device case 102 via magnetic coupling of the second set of magnetic elements 118 of the mounting plate 110 with the first set of magnetic elements 180 of the device case 102; and retain the leg assembly 150 within the leg receptacle 120 on the outer face 114 of the mounting plate 110 opposite the inner face 112, such that a user may deploy the leg assembly 150 outward—away from the exterior face of the device case 102—from the leg receptacle 120 while the mounting plate 110 is coupled to the device case 102. Thus, the user may continue viewing a screen of her mobile device—housed within the device case 102—and/or adjust a position of the leg assembly 150 without detaching the mobile tripod 104 from her device case 102.

4.1 Leg Receptacle+Aperture+Channel

In one implementation, the mounting plate 110 can define: the leg receptacle 120 arranged on an upper region of the mounting plate 110; the aperture 124 arranged on a lower region (e.g., below the upper region) of the mounting plate 110 (e.g., adjacent and/or contiguous a bottom edge of the mounting plate 110); and the channel 122 extending between the leg receptacle 120 and the aperture 124.

The leg receptacle 120 can be configured to accept and retain the leg assembly 150 in the retracted position and to enable a user to deploy the leg assembly 150 into the deployed position. In one implementation, the leg receptacle 120 can define a depth approximately equivalent (e.g., within 1 millimeter, within 2 millimeters) a height of the leg assembly 150 in the retracted position, such that an outer surface of the leg assembly 150 seats flush with the outer face 114 of the mounting plate 110.

Additionally, in one implementation, the mounting plate 110 can define a base section 190—forming a bottom surface of the leg receptacle 120—coextensive the inner face 112 of the mounting plate 110, such that the base section 190 and the inner face 112 form a cohesive, unitary surface. In particular, the base section 190 can be configured to extend across a portion of the leg receptacle 120—coplanar the inner face 112 of the mounting plate 110—such that the leg assembly 150 seats against the base section 190 in the retracted position, the base section 190 arranged between the leg assembly 150 and the exterior face of the device case 102. The base section 190 can therefore be configured to: receive an inner surface of the leg assembly 150 in the retracted position; and prevent contact between the exterior face of the device case 102 and the inner surface of the leg assembly 150 in the retracted position. Further, the base section 190 can define a height such that—when seated within the leg receptacle 120, against the base section 190, in the retracted position—the leg assembly 150 seats approximately flush with the outer face 114 of the mounting plate 110.

For example, the mounting plate 110 can include a base section 190: including a first section extending across an upper portion of the leg receptacle 120; and a second section extending across a lower portion of the leg receptacle 120 proximal the channel 122. In this example, a first portion of the leg assembly 150 can seat against the first section of the base section 190, a second portion of the leg assembly 150 can seat against the second section of the base section 190, and a third section of the leg assembly 150—arranged between the first and second section of the leg assembly 150—can seat above the exterior face of the device case 102, offset by a distance equivalent the height of the base section 190.

Additionally, in another implementation, the mounting plate 110 can define the channel 122: extending between the leg receptacle 120 and the aperture 124; and configured to transiently receive the connector 142 coupled to the spherical end 140 and the leg assembly 150, such that the connector 142 and/or the leg assembly 150 seat flush with the outer surface of the mounting plate 110 in the retracted position.

In the preceding implementation, the aperture 124 can be configured to house a set of socket sections 132 configured to retain the spherical end 140—within a socket 126 formed by the set of socket sections 132 (e.g., within the aperture 124)—coupled to the leg assembly 150 and rotatably coupled to the mounting plate 110 via encapsulation by the set of socket sections 132. Therefore, the spherical end 140 can rotate within the socket 126 (e.g., within the aperture 124) to: pivot the connector 142 and the leg assembly 150 from seated within the channel 122 and the leg receptacle 120, respectively—approximately flush with the outer face 114 of the mounting plate 110—in the retracted position, outward from the exterior face of the device case 102 and into the deployed position; and pivot the connector 142 and the leg assembly 150 from the deployed position back into the retracted position seated approximately flush with the outer face 114 of the mounting plate 110 within the channel 122 and the leg receptacle 120. Therefore, the leg receptacle 120, the channel 122, and the aperture 124 can cooperate to retain the spherical end 140, the connector 142, and the leg assembly 150 within a singular plane defined by the mounting plate 110.

4.2 Second Set of Magnetic Elements

The mounting plate 110 can include a second set of magnetic elements 118 arranged about the polygonal boss 116 (e.g., within the mounting plate 110)—arranged in a pattern corresponding to the pattern of the first set of magnetic elements 180 in the device case 102—configured to magnetically couple to the first set of magnetic elements 180 in the device case 102. Generally, the second set of magnetic elements 118 of the mounting plate 110 can cooperate with the first set of magnetic elements 180 of the device case 102 to retain the inner face 112 of the mounting plate 110 against the exterior face of the device case 102.

In one implementation, the mounting plate 110 can include a set of two magnetic elements (e.g., magnets, ferrous material) arranged in a particular pattern about the leg receptacle 120. The two magnetic elements can be configured to magnetically couple to the first set of magnetic elements 180 of the device case 102 in a set of orientations, such that the user may adjust an orientation of the device case 102—and/or the mobile device housed within the device case 102—relative the tripod 104.

For example, the device case 102 can include an array of magnetic elements arranged in a first pattern—such as in a square, rectangular, or circular pattern—exhibiting rotational symmetry greater than four. In this example, the mounting plate 110 can include: a first magnet (e.g., a trapezoidal magnet) arranged on a first side of the leg receptacle 120; a second magnet (e.g., a trapezoidal magnet) arranged on a second side of the leg receptacle 120, opposite the first side of the leg receptacle 120. The first and second magnets of the mounting plate 110 can then couple to: a first subset of magnetic elements, in the array of magnetic elements of the device case 102, to couple the mounting plate 110 to the device case 102 in a first orientation (e.g., a first portrait orientation); a second subset of magnetic elements, in the array of magnetic elements of the device case 102, to couple the mounting plate 110 to the device case 102 in a second orientation (e.g., a first landscape orientation), such as by rotating the mounting plate 110 90-degrees, relative the device case 102, from the first orientation; a third subset of magnetic elements, in the array of magnetic elements of the device case 102, to couple the mounting plate 110 to the device case 102 in a third orientation (e.g., a second portrait orientation), such as by rotating the mounting plate 110 90-degrees from the second orientation; and a fourth subset of magnetic elements, in the array of magnetic elements of the device case 102, to couple the mounting plate 110 to the device case 102 in a fourth orientation (e.g., a second landscape orientation), such as by rotating the mounting plate 110 90-degrees from the third orientation.

In another implementation, the mounting plate 110 can include a set of four magnetic elements arranged in a particular pattern about the leg receptacle 120. Similarly, in this implementation, the four magnetic elements can be configured to magnetically couple to the first set of magnetic elements 180 of the device case 102 in a set of orientations, such that the user may adjust an orientation of the device case 102—and/or the mobile device housed within the device case 102—relative the tripod 104. For example, the mounting plate 110 can include a set of four magnetic elements arranged about the leg receptacle 120 in a substantially square pattern. In particular, in this example, the mounting plate 110 can include: a first magnetic element arranged on a first side of the leg receptacle 120; a second magnetic element arranged on the first side of the leg receptacle 120 offset (e.g., above) the first magnetic element by a first distance; a third magnetic element arranged on a second side of the leg receptacle 120 and offset the second magnetic element by approximately (e.g., within ten percent) the first distance; and a fourth magnetic element arranged on the second side of the leg receptacle 120 and offset (e.g., above) the first and third magnetic element by approximately the first distance. By arranging the four magnets in this square pattern, the mounting plate 110 can thus couple to the first set of magnetic elements 180 of the device case 102 in multiple orientations (e.g., landscape, portrait) by rotating the mounting plate 110 90-degrees, 180-degrees, and/or 270-degrees.

4.3 Polygonal Boss

In one variation—in which the device case 102 includes the rectangular bore 182 arranged on the exterior face of the device case 102—the mounting plate 110 can include: a polygonal boss 116 extending from the inner face 112 of the mounting plate 110 and configured to insert into the polygonal bore of the device case 102; and the second set of magnetic elements 118 arranged about the polygonal boss 116 and configured to transiently couple to the first set of magnetic elements 180 of the device case 102 to transiently retain the mounting plate 110 against the exterior face of the device case 102. The polygonal boss 116 can be configured to fit into the rectangular bore 182 to couple the mobile tripod 104 with the device case 102 and thus constrain movement of the polygonal boss 116 within a plane defined by the polygonal boss 116 relative to the device case 102 and constrain rotation of the mobile tripod 104 mount relative to the device case 102.

In this variation, the mounting plate 110 can be configured to: magnetically couple to the device case 102 via alignment of the second set of magnetic elements 118 of the mounting plate 110 with the first set of magnetic elements 180 of the device case 102; and mechanically couple to the device case 102 via insertion of the polygonal boss 116 on the inner face 112 of the mounting plate 110 into the rectangular bore 182 of the device case 102. In particular, in this variation, the second set of magnetic elements 118 of the mounting plate 110 can be configured to cooperate with the first set of magnetic elements 180 of the device case 102 to: align the polygonal boss 116 with the rectangular bore 182 of the insert; and to retain the polygonal boss 116 within the rectangular bore 182 of the insert, such that the device case 102 is fixed to the mobile tripod 104 via magnetic forces and the polygonal boss 116—and therefore the mobile tripod 104—is constrained laterally relative the device case 102.

Therefore, in this implementation, the first set of magnetic elements 180 can be arranged about the rectangular bore 182 of the device case 102 and positioned to guide the polygonal boss 116 of the mobile tripod 104 into a locking arrangement within the rectangular bore 182. A user may therefore quickly locate and passively lock (e.g., without manually screwing, tightening, etc.) the device case 102 onto the mobile tripod 104 with a single hand and in a single motion by aligning the polygonal boss 116 with the rectangular bore 182 and/or the first set of magnetic elements 180 with the second set of magnetic elements 118.

In one implementation, the mounting plate 110 can include a rectangular boss 116 with radiused corners. For example, the mounting plate 110 can include a square boss 116 defining a square cross-section including radiused corners. Alternatively, in another implementation, the mounting plate 110 can include a circular boss 116. In this implementation, the circular boss 116 can be configured to insert into the rectangular bore 182 of the device case 102 to constrain movement of the mounting plate 110 parallel the device case 102. The rectangular boss 116 of the device case 102 can be configured to define a square cross-section exhibiting a width equivalent or slightly greater than a radius of the circular boss 116, such that the circular boss 116 can insert into and fit within the rectangular bore 182 with minimal gaps between a center of each wall of the rectangular bore 182 and the circular boss 116. In this implementation, a user may rotate her mobile device between a landscape and portrait orientation without decoupling her device case 102 from the mobile tripod 104.

4.4 Pivot Control Assembly

The mobile tripod 104 can include a pivot control assembly 130 integrated into the mounting plate 110 and defining a socket 126 configured to house the spherical end 140 of the connector 142. In particular, the pivot control assembly 130 can be configured to: retain the spherical end 140—rigidly coupled to the leg assembly 150 via the connector 142—within the socket 126; and enable rotation of the spherical end 140 within the socket 126, thereby enabling the leg assembly 150 to pivot between the retracted and deployed positions. In one implementation, the mounting plate 110 can include the pivot control assembly 130 integrated into the mounting plate 110 along an edge (e.g., a bottom edge) of the mounting plate 110, such that the leg assembly 150 can pivot about the edge of the mounting plate 110.

Generally, the pivot control assembly 130 can include: a threaded section 136 extending along an axis intersecting a center of the spherical end 140 and/or a center of the socket 126; a pivot-control feature 138 configured to maintain an orientation of the spherical end 140 within the socket 126 responsive to rotation by a user and configured to translate along the threaded section 136 when rotated; a set of socket sections 132 configured to form the socket 126 configured to house the spherical end 140; a spring section 134 interposed the set of socket sections 132 and the threaded section 136 and configured to depress the set of socket sections 132 against the spherical end 140.

In one implementation, the pivot control assembly 130 can be configured to fix an orientation of the spherical end 140 within the socket 126 relative the mounting plate 110 or to unlock the orientation of the spherical end 140 responsive to rotation by a user. In particular, the pivot-control feature 138 can be configured to: translate along the threaded section 136 toward the spring section 134, drive the spring section 134 toward the set of socket sections 132 to compress the set of socket sections 132 against the spherical end 140, and fix an orientation of the spherical end 140 within the socket 126 responsive to rotation in a first direction.

In one implementation, as shown in FIG. 8, the pivot control assembly 130 can include: the set of socket sections 132 flexibly coupled to the mounting plate 110, arranged within the aperture 124, and defining a socket 126; a threaded section 136 arranged adjacent the set of socket sections 132 and extending along an axis orthogonal a central axis defined by the channel 122; a spring section 134 arranged between the threaded section 136 and the set of socket sections 132 and configured to bias the set of socket sections 132 onto the spherical end 140; and a pivot-control feature 138 coupled to the threaded section 136 and configured to maintain compression of the spring section 134 against the set of socket sections 132, bias the set of socket sections 132 onto the spherical end 140, and maintain a target clamping force between the set of socket sections 132 and the spherical end 140.

In the preceding implementation, the pivot-control feature 138 (e.g., a set screw) can be configured to: translate along the threaded section 136 in a first translational direction, toward the spring section 134, to compress the spring section 134 against the set of socket sections 132, bias the set of socket sections 132 onto the spherical end 140, and increase the target clamping force between the set of socket sections 132 and the spherical end 140, responsive to rotation in a first rotational direction; and translate along the threaded section 136 in a second translational direction, opposite the first direction, to release the spring section 134 from the set of socket sections 132, release the set of socket sections 132 from the spherical end 140, and decrease the target clamping force between the set of socket sections 132 and the spherical end 140, responsive to rotation in a second rotational direction opposite the first rotational direction. In this implementation, the pivot control assembly 130 can therefore be configured to maintain a target clamping force—corresponding to a position of the pivot-control feature 138 within the threaded section 136—between the set of socket sections 132 and the spherical end 140. The user may thus adjust the position of the pivot-control feature 138 (e.g., a set screw) within the threaded section 136—such as by rotating the pivot-control feature 138 with a flathead or hex head—to adjust compression of the spring section 134, and thereby adjust the clamping force between the set of socket sections 132 and the spherical end 140.

Further, in the preceding implementation, by maintaining this target clamping force between the set of socket sections 132 and the spherical end 140, the pivot control assembly 130 can enable the mounting plate 110 to constrain rotation of the spherical end 140 within the socket 126—and thereby retain the leg assembly 150 within the leg receptacle 120 in the retracted position—and prevent pivoting of the leg assembly 150 outward from the leg receptacle 120 while stored in the retracted position, such as due to forces (e.g., a torque) applied to the spherical end 140 and/or leg assembly 150 while the user carries her phone or stores her phone in her backpack. However, the user may (intentionally) apply a force on the leg assembly 150—and thus apply a torque on the spherical end 140 that exceeds the target clamping force—to rapidly deploy the leg assembly 150 outward from the leg receptacle 120 and into the deployed position.

Additionally and/or alternatively, in one variation, the pivot control assembly 130 can include a socket 126 bushing arranged about the spherical end 140 interposed the set of socket sections 132 and the spherical end 140, such that—when the pivot control assembly 130 is rotated (e.g., by a user)—the spring section 134 depresses the set of socket sections 132 against the socket 126 bushing which engages surfaces of the spherical end 140.

4.4.1 Socket Sections

The pivot control assembly 130 can include a set of socket sections 132 configured to form the socket 126 configured to house the spherical end 140.

In one implementation, as shown in FIG. 8, the pivot control assembly 130 includes a first fixed socket section 132 and a second adjustable socket section 132 spaced at 180 degrees around the central axis of the spherical end 140 within the aperture 124. Each socket section 132 includes a concave surface on a side facing the spherical end 140. When the pivot control assembly 130 is engaged by a user, the concave surfaces of the socket sections 132 engage with surfaces of the spherical end 140, thereby locking the spherical end 140 in a fixed position.

For example, the pivot control assembly 130 can include: a first socket section 132 arranged within the aperture 124 on a first side of the spherical end 140; and a second socket section 132 arranged within the aperture 124 on a second side of the spherical end 140 opposite the first side, the second socket section 132 interposed the spherical end 140 and the spring section 134. The first socket section 132 can be constrained within the aperture 124 by the spherical end 140 and walls of the aperture 124. The second socket section 132 can be can be more loosely constrained by the spherical end 140 and the spring section 134 such that when the spring section 134 is extended—and therefore applying minimal force against the second socket section 132—the second socket section 132 rests loosely between the spring section 134 and the spherical end 140. The spherical end 140 is therefore constrained laterally within the socket 126 but can pivot freely within the socket 126. Alternatively, when the spring section 134 is compressed (e.g., due to rotation of the pivot control assembly 130 by a user), the spring section 134 compresses the second socket section 132 against the spherical end 140, the spherical end 140 compresses against the first socket section, and the spherical end 140 is constrained both laterally and pivotably within the socket 126.

In this implementation, the aperture 124 of the mounting plate 110 can be configured to fit: the set of socket sections 132; the spherical end 140 partially encompassed by the set of socket sections 132; and the spring section 134. Therefore, the aperture 124 can define a length equivalent or greater than a length of the fully-extended spring section 134 (e.g., uncompressed), the set of socket sections 132, and a portion of the spherical end 140 (e.g., the portion not encompassed by the set of socket sections 132) combined.

In one implementation, the set of socket sections 132 can cooperate to define: the socket 126 configured to house the spherical end 140; an upper gap extending from the socket 126 toward the channel 122 (e.g., extending between the aperture 124 and the leg receptacle 120) of the mounting plate 110 and configured to transiently receive the column; and a lower gap tapering outwardly from the socket 126 to a bottom face of the mounting plate 110 and configured to transiently receive the column. The set of socket sections 132 can be configured such that the spherical end 140 is constrained within the socket 126 formed by the set of socket sections 132 and can not penetrate the upper or lower gap.

The column can therefore seat within the upper gap and the channel 122 of the mounting plate 110—the upper gap contiguous the channel 122—with the leg assembly 150 in the retracted position. Further, by extending the lower gap to the bottom surface of the device case 102, the lower gap enables passage of the column through the lower gap such that the spherical end 140—coupled to the column—can be further rotated within the socket 126, thereby enabling the column to be rotated (e.g., by a user) about the bottom surface (e.g., greater than 180 degrees).

4.4.2 Spring Section

The spring section 134 can exhibit a high spring rate and be configured to maintain a target clamping force (e.g., a holding torque) between the set of socket sections 132 and the spherical end 140 when the spring is compressed (e.g., due to rotation of the pivot-control feature 138 by a user) to limit rotation of the spherical end 140 within the socket 126 and/or to fix a position of the spherical end 140 within the socket 126.

In one implementation, the spring section 134 includes a set of springs arranged in a stack concentric an axis defined by the threaded section 136 and intersecting a center of the spherical end 140. For example, the spring section 134 can include a set of disc springs (e.g., a set of Belleville springs) arranged in a stack, each disc spring, in the set of disc springs, defining a concave surface facing the spherical end 140, such that each disc spring nests within an adjacent disc spring in the stack. In one example, the spring section 134 can include a set of 12 disc springs arranged between the pivot-control feature 138 and the set of socket sections 132.

4.4.3 Pivot-Control Feature

The pivot-control feature 138 can be configured to maintain compression of the spring section 134 against the set of socket sections 132, thereby biasing the set of socket sections 132 onto the spherical end 140 and maintaining a target clamping force between the set of socket sections 132 and the spherical end 140.

In particular, the pivot-control feature 138 (e.g., a screw) can be configured to translate along the threaded section 136—arranged adjacent the spring section 134—to compress and/or decompress the spring section 134. In one implementation, the pivot-control feature 138 is configured to: translate along the threaded section 136 in a first direction, toward the spring section 134, to compress the spring section 134 against the set of socket sections 132, bias the set of socket sections 132 onto the spherical end 140, and increase the target clamping force between the set of socket sections 132 and the spherical end 140 responsive to rotation, by the tool, in a first direction. The pivot-control feature 138 can therefore be configured to engage the spring section 134 to maintain and/or adjust compression of the spring section 134 and thereby the clamping force between the set of socket sections 132 and the spherical end 140.

For example, the spring section 134 can include a set of concentric disc springs defining a bore extending through the spring section 134 and exhibiting a first cross-section. In this example, the pivot-control feature 138 can include: an unthreaded portion extending through the bore of the spring section 134; and a threaded portion extending coaxially from the unthreaded portion opposite the set of socket sections 132, defining a first cross-section greater than a second cross-section of the bore, and configured to mate with the threaded section 136. Further, in this example, the set of socket sections 132 can include: a first socket 126 arranged between the spring section 134 and a first side of the spherical end 140 and defining a cavity configured to receive a portion of the unthreaded portion responsive to rotation of the pivot-control feature 138 in a first direction; and a second socket section 132 arranged on a second side of the spherical end 140 opposite the first side. Therefore, in this example, the threaded portion of the pivot-control feature 138 can be configured to translate, in a first direction, within the threaded section 136, to compress the set of concentric disc springs against the first socket section, such that the unthreaded portion extends into the cavity of the first socket section.

Additionally, in one implementation, the pivot-control feature 138 can be accessible to a user on a side face of the mounting plate 110 orthogonal the inner and outer face 114. For example, the pivot control assembly 130 can include a screw extending outward from the side face of the mounting plate 110 and along a plane: orthogonal a central axis of the mounting plate 110; and intersecting a center of the spherical end 140. The user may then tighten the screw—by turning the screw in a first direction—to fix the orientation of the spherical end 140 relative the mounting plate 110 and release the screw—by turning the screw in a second direction opposite the first direction—to unlock the orientation of the spherical end 140.

5. Connector

The connector 142 defines a first end coupled to the spherical end 140 and a second end coupled to the leg assembly 150 (e.g., via a center leg 152 of the leg assembly 150). Therefore, the connector 142 enables rotation of the leg assembly 150 relative the mounting plate 110 in unison with rotation of the spherical end 140 within the socket 126.

In one implementation, the connector 142 defines a circular cross-section to enable rotation of the connector 142 within the gap defined by the set of socket sections 132.

The connector 142 can define a relatively low height (e.g., less than 1-inch), such that when the leg assembly 150 is deployed, the column can support a minimum load defined by the mounting plate 110, the device case 102, and the user's mobile device.

In one variation, the connector 142 can be flexibly coupled to the center leg 152 of the leg assembly 150, such that the center leg 152 can rotate both relative the mounting plate 110 and the connector 142, thereby enabling increased mobility and positioning of the leg assembly 150 in the deployed position.

5.1 Spherical End

Generally, the spherical end 140 can be: coupled to a first end of the connector 142 opposite the leg assembly 150; and housed in a socket 126 of the pivot control assembly 130 of the mounting plate 110. The spherical end 140 can be rigidly coupled to the leg assembly 150 via the connector 142 and pivotably coupled to the mounting plate 110 within the socket 126. In one implementation, the spherical end 140 is configured to nest between the set of socket sections 132 integrated in the mounting plate 110 to form a ball joint.

6. Leg Assembly

The mobile tripod 104 includes a leg assembly 150 rotatably coupled to the mounting plate 110. In particular, the leg assembly 150 can connect to a second end of the connector 142 opposite the spherical end 140, such that the leg assembly 150 can rotate relative the mounting plate 110 as the spherical end 140 rotates within the socket 126. The leg assembly 150 can be configured to: seat within the leg receptacle 120 of the mounting plate 110 in the retracted position; and to rotate out of the leg receptacle 120 in the deployed position to occupy a range of footprints.

Generally, the leg assembly 150 includes: a center leg 152; a pair of outer legs 154 flexibly coupled to the center leg 152. In particular, the leg assembly 150 can include: a center leg 152 coupled to the connector 142; a first outer leg 154 flexibly coupled to the center leg 152 at a first location on the center leg 152; and a second outer leg 154 flexibly coupled to the center leg 152 at a second location opposite the first location on the center leg 152, such that the leg assembly 150 exhibits symmetry (e.g., in the retracted position) across an axis extending along a length of the center leg 152 coaxial the connector 142.

Therefore, when the leg assembly 150 is in the deployed position, a user may manipulate an orientation of each leg in the leg assembly 150 individually, thereby enabling the user to deploy the leg assembly 150 in a wide range of footprints.

In one implementation, the leg assembly 150 can include: a center leg 152 defining a first size; a first outer leg 154 flexibly coupled to the center leg 152 and defining a second size less than the first size; and a second outer leg 154 flexibly coupled to the center leg 152 opposite the first outer leg 154 and defining a third size approximately equivalent (e.g., within five percent) the second size.

In one variation, the leg assembly 150 can include a set of feet. In this variation, each leg in the leg assembly 150 (e.g., the center leg 152 and the pair of outer legs 154) can define; a proximal end; a distal end opposite the proximal end and the connector 142 and configured to contact a base surface (e.g., the ground, a floor, a surface of a desk) when the leg assembly 150 is in the deployed position to mount the mobile tripod 104 system 100 to the base surface. Each leg in the leg assembly 150 can include a foot coupled to the distal end of the leg, such that the foot contacts the base surface to mount the mobile tripod 104 system 100 to the base surface. In one implementation, each leg, in the leg assembly 150, can include a rubber tip (i.e., a rubber foot) configured to contact the base surface and exhibiting a minimum coefficient of friction, such that the leg exhibits minimal slip when in contact with the base surface, thereby enabling the leg assembly 150 to maintain a particular orientation.

6.1 Leg Deployment

The user may remove the leg assembly 150 from the leg receptacle 120 by applying a force to the leg assembly 150. For example, the user may insert her finger into the leg receptacle 120 of the mounting plate 110 and lift the leg assembly 150 upward out of the leg receptacle 120. Upon deploying the leg assembly 150 out of the leg receptacle 120, the user may then position the legs in an orientation (e.g., desired by the user)—in a wide range of orientations (i.e., footprints)—to mount the mobile tripod 104 to a base surface.

The leg assembly 150 includes a set of legs configured to rotate out of the leg receptacle 120 and into the deployed position. In one implementation, as shown in FIGS. 2A, 2B, 5, 7, 16A-16I, 18A-18I, and 19B, the leg assembly 150 includes a center leg 152 and a set of outer legs 154 flexibly coupled to the center leg 152, such that the set of outer legs 154 extend below and/or toward the device case 102 and the center leg 152 extends outward from the device case 102 in the deployed position. In this implementation, the set of outer legs 154 can therefore be configured to rotate greater than 180-degrees—such as relative the mounting plate 110—from the retracted position to the deployed position. The center leg 152 can thus extend opposite the set of outer legs 154 and/or away from the device case 102 in the deployed position, such that the center leg 152 and the set of outer legs 154 cooperate to define a triangular footprint and support the device case 102—including a mobile device housed within the device case 102—in the deployed position.

In one implementation, the leg receptacle 120 can define a length greater than a length of the leg assembly 150 to enable a user to access and deploy the leg assembly 150 from the retracted position to the deployed position by inserting her finger into the leg receptacle 120. For example, the leg receptacle 120 can define a first length greater than a second length of the leg assembly 150. The leg assembly 150 can therefore define a gap between the distal end (e.g., the feet) of the leg assembly 150 and an upper wall of the leg receptacle 120. In this example, the user may insert her finger into this gap to access the leg assembly 150 and pull upward to rotate the leg assembly 150 out of the leg receptacle 120 and into the deployed position.

Additionally and/or alternatively, in another implementation, the mounting plate 110 can define an indentation 128 (e.g., a recess) along an edge of leg receptacle 120 and configured to enable a user to access and deploy the leg assembly 150 from the retracted position to the open position. For example, the mounting plate 110 can include an indentation 128 adjacent an upper edge of the leg receptacle 120 such that the distal end of the leg assembly 150 (e.g., the rubber tips of each leg) seats above an interior surface of the indentation 128. In this example, a user may slip her finger into the indentation 128 and under the distal end of the leg assembly 150. The user may then lift her finger outward from the mounting plate 110 to deploy the leg assembly 150 from the retracted position to the deployed position.

7. Variation: Removable Tool

In one variation, as shown in FIGS. 1A, 2B, 4, 7, 10, and 17A-17C, the mobile tripod 104 can also include a removable tool 170 coupled to the mobile tripod 104 and configured to enable a user to manipulate the pivot-control feature 138. Generally, the tool 170 can define a distal end configured to manipulate the pivot-control feature 138 of the pivot control assembly 130 to lock and/or unlock an orientation of the spherical end 140 within the socket 126.

For example, the mobile tripod 104 can include a removable screwdriver removably coupled to the mobile tripod 104. In this example, the pivot control assembly 130 can include a screw as the pivot-control feature 138 and defining a screw head accessible to a user along an edge of the mounting plate 110. The user may: remove the removable screwdriver from the mobile tripod 104; insert a distal end of the removable screwdriver into the screw head; and rotate the removable screwdriver in a first direction to unlock an orientation of the spherical end 140 within the socket 126, thereby unlocking a position of the leg assembly 150. The user may then: rotate the leg assembly 150 to the deployed position; manipulate the leg assembly 150 and/or individual legs of the leg assembly 150 to position the leg assembly 150 in a first orientation to mount the mobile tripod 104 to a base surface; insert the distal end of the removable screwdriver into the screw head; and rotate the removable screwdriver in a second direction—opposite the first direction—to lock the orientation of the spherical end 140 within the socket 126, thereby locking the leg assembly 150 in the first orientation.

In one implementation, the center leg 152 of the leg assembly 150 can define a tool receptacle 172 configured to transiently house the removable tool 170. The tool receptacle 172 can be integrated into an inner surface of the center leg 152 configured to mate with the exterior face of the device case 102. Therefore, when the mobile tripod 104 is coupled to the device case 102 with the leg assembly 150 in the retracted position, the exterior face of the device case 102—flush with the inner surface of the center leg 152—can form a barrier to prevent the removable tool 170 from escaping (e.g., inadvertently falling out from) the tool receptacle 172.

Additionally, in this implementation, the center leg 152 can include a relief arranged proximal an edge of the tool receptacle 172 and configured to enable a user to access the removable tool 170. For example, the center leg 152 can include a relief arranged along a bottom edge of the tool receptacle 172. The user may: depress her finger into the relief to access a bottom surface of the removable tool 170; and exert a force upward on the bottom surface of the removable tool 170 to remove the removable tool 170 from the tool receptacle 172.

Additionally, in another implementation, the center leg 152 of the leg assembly 150 can include a first magnetic feature arranged within the tool receptacle 172. The tool receptacle 172 can include a second magnetic feature configured to couple with the first magnetic feature to retain the removable tool 170 within the tool receptacle 172. In this implementation, a user may apply a force to the tool receptacle 172 greater than a magnetic force between the first and second magnetic features to remove the removable tool 170 from the tool receptacle 172.

8. Variation: Removable Polygonal Boss

In one variation, the mobile tripod 104 can be configured to couple to any magnetic device case 102 (e.g., distinct from the device case 102).

In this variation, the polygonal boss 116 of the mounting plate 110 can be removable from the mounting plate 110 such that the inner face 112 of the mounting plate 110 seats flush with an exterior face of a magnetic device case 102 (e.g., which may or may not include a rectangular bore 182). In this variation, the mounting plate 110 can: define a boss 116 receptacle configured to transiently house the polygonal boss 116; and include a boss 116 locking tab 160 integrated into the mounting plate 110 and configured to insert into a recess 166 of the polygonal boss 116 to lock the polygonal boss 116 within the boss 116 receptacle.

In particular, the boss 116 locking tab 160 can be configured: to lock against (or engage, extend into) a recess 166 defined by the polygonal boss 116; and thus restrict movement of the polygonal boss 116 within the boss 116 receptacle. In one implementation shown in FIG. 9, a spring 164 drives the boss 116 locking tab 160 forward toward the recess 166 to engage the boss 116 locking tab 160 within the recess 166, thereby retaining the polygonal boss 116 within the boss 116 receptacle. In this implementation, the boss 116 locking tab 160 is mounted to and pivots about a pivot arranged within the mounting plate 110 and adjacent the boss 116 receptacle. The boss 116 locking tab 160 can define a tooth 162 configured to transiently insert into the recess 166 of the polygonal boss 116. The spring 164 is laterally offset from the pivot and drives the boss 116 locking tab 160—including the tooth 162—inward to insert the tooth 162 into the recess 166 of the polygonal boss 116, thus retaining the polygonal boss 116 within the boss 116 receptacle.

The boss 116 locking tab 160 is further configured to pivot about the pivot and against the spring 164 responsive to a user depressing the boss 116 locking tab 160 directly, which withdraws the tooth 162 from the recess 166 of the polygonal boss 116 and releases the polygonal boss 116 from the boss 116 receptacle.

Additionally, in this implementation, the user may implement the removable tool 170—transiently housed within the center leg 152 of the leg assembly 150—to manipulate the boss 116 locking tab 160. For example, the user may: access the removable tool 170 housed within the tool receptacle 172 of the center leg 152; manipulate the removable tool 170 to depress the locking tab; and apply a force on the polygonal boss 116 to depress the spring 166, release the tooth 162 from the recess 166, and thus remove the polygonal boss 116 from the boss 116 receptacle. Then, the user may couple her magnetic device case 102—configured to house her mobile device—to the mobile mount by aligning magnetic elements in her device magnetic device case 102 with the second set of magnetic elements 118 integrated in the mounting plate 110, the exterior face of her magnetic device case 102 flush with the inner face 112 of the mounting plate 110.

In this example, the user may later decouple her magnetic device case 102 from the mobile mount and reinsert the polygonal boss 116 into the boss 116 receptacle. In particular, to reinsert the polygonal boss 116, the user may align the polygonal boss 116 with the boss 116 receptacle and press down. The force of the polygonal boss 116 on the boss 116 locking tab 160 counters the spring 164 and applies a torque to the boss 116 locking tab 160, thereby rotating the camera locking tab outward (e.g., away from the recess 166) about the pivot and enabling the polygonal boss 116 to seat within the boss 116 receptacle. Once the polygonal boss 116 is seated within the boss 116 receptacle—and the applied torque to the boss 116 locking tab 160 is removed—the boss 116 locking tab 160 can rotate back inward (e.g., toward the recess 166) to insert the tooth 162 into the recess 166, thereby locking the polygonal boss 116 within the boss 116 receptacle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A mobile tripod comprising:
a mounting plate defining a leg receptacle, an aperture arranged along an edge of the mounting plate, and a channel extending along an outer face of the mounting plate between the leg receptacle and the aperture; and comprising a first set of magnetic elements arranged in a pattern about the leg receptacle configured to transiently couple to a second set of magnetic elements in a mobile device case to retain an inner face of the mounting plate, opposite the outer face, against an exterior face of the mobile device case; and
a leg assembly coupled to the mounting plate and configured to transiently seat within the leg receptacle in a retracted position and deploy outward from an exterior face of the mobile device case into a target footprint to mount the tripod on a base surface in a deployed position.

2. The mobile tripod of claim 1 further comprising a set of socket sections flexibly coupled to the mounting plate, arranged within the aperture, and defining a socket and a connector extending from the leg assembly configured to seat within the channel in the retracted position; and comprising a spherical end arranged within the socket, encapsulated by the set of socket sections, and configured to rotate within the socket to pivot the leg assembly between the retracted position and the deployed position.

3. The mobile tripod of claim 2, wherein the set of socket sections comprises a first socket section arranged within a first side of the aperture and a second socket arranged within a second side of the aperture and configured to cooperate with the first socket section to define an upper gap extending from the socket toward the channel; and a lower gap extending from the socket to a lower edge of the mounting plate; and wherein the connector is configured to seat within the upper gap and the channel to locate the leg assembly within the leg receptacle in the retracted position and seat within the lower gap to locate the leg assembly in the target footprint in the deployed position.

4. The mobile tripod of claim 1, wherein the leg assembly comprises a set of legs comprising a center leg and a set of outer legs coupled to the center leg.

5. The mobile tripod of claim 4 wherein the set of outer legs are configured to rotate relative the center leg to locate the leg assembly in the target footprint.

6. The mobile tripod of claim 4 wherein the set of outer legs comprises a first outer leg flexibly coupled to the center leg at a first location on the center leg and a second outer leg flexibly coupled to the center leg at a second location, opposite the first location, on the center leg.

7. The mobile tripod of claim 2, wherein the mounting plate comprises a threaded section arranged adjacent the set of socket sections and extending along an axis orthogonal a central axis defined by the channel; a spring section arranged between the threaded section and the set of socket sections and configured to bias the set of socket sections onto the spherical end; and a pivot-control feature coupled to the threaded section and configured to maintain compression of the spring section against the set of socket sections, bias the set of socket sections onto the spherical end, and maintain a target clamping force between the set of socket sections and the spherical end.

8. The mobile tripod of claim 1 wherein the first set of magnetic elements comprises a first magnet arranged adjacent a first side of the leg receptacle; and a second magnet arranged adjacent a second side of the leg receptacle opposite the first side of the leg receptacle.

9. The mobile tripod of claim 1, wherein the first set of magnetic elements is configured to transiently couple to the second set of magnetic elements in the mobile device case in a first set of orientations to retain the inner face of the mounting plate against the exterior face of the device case and couple the device case to the tripod in a portrait orientation; and transiently couple to the second set of magnetic elements in a second set of orientations to retain the inner face of the mounting plate against the exterior face of the device case and couple the device case to the tripod in a landscape orientation.

10. The mobile tripod of claim 1 wherein the mounting plate comprises a boss extending from the inner face of the mounting plate and configured to insert into a bore of a mobile device case to constrain rotation of the mounting plate relative the mobile device case.

11. A mounting system comprising
the mobile tripod of claim 1; and
a device case comprising a second set of magnetic elements arranged in a second pattern to retain the inner face of the mounting plate, opposite the outer face, against an exterior face of the mobile device case.

12. The mounting system of claim 11 wherein the mobile device case comprises a bore arranged on an exterior face of the mobile device case and wherein the second set of magnetic elements are arranged about the bore and wherein the mounting plate comprises a boss extending from the inner face of the mounting plate and configured to insert into the bore of a mobile device case to constrain rotation of the mounting plate relative the mobile device case.

* * * * *